(12) United States Patent
Fukuda et al.

(10) Patent No.: US 7,350,977 B2
(45) Date of Patent: Apr. 1, 2008

(54) DOUBLE-ROW BALL BEARING AND BEARING DEVICE FOR SUPPORTING PINION SHAFT

(75) Inventors: Toshirou Fukuda, Osaka (JP); Hideo Ueda, Osaka (JP); Toshihiro Kawaguchi, Osaka (JP); Kunihiko Yokota, Osaka (JP); Motoshi Kawamura, Osaka (JP); Muneyasu Akiyama, Osaka (JP); Tomonori Nakashita, Osaka (JP)

(73) Assignee: Jtekt Corporation, Osaka (JP)

( * ) Notice: Subject to any disclaimer, the term of this patent is extended or adjusted under 35 U.S.C. 154(b) by 741 days.

(21) Appl. No.: 10/511,309

(22) PCT Filed: Apr. 17, 2003

(86) PCT No.: PCT/JP03/04907

§ 371 (c)(1),
(2), (4) Date: Oct. 15, 2004

(87) PCT Pub. No.: WO03/089798

PCT Pub. Date: Oct. 30, 2003

(65) Prior Publication Data

US 2005/0232524 A1  Oct. 20, 2005

(30) Foreign Application Priority Data

Apr. 19, 2002 (JP) ............................. 2002-117091
Dec. 9, 2002 (JP) ............................. 2002-356933

(51) Int. Cl.
*F16C 19/38* (2006.01)
*F16H 57/04* (2006.01)

(52) U.S. Cl. ...................................... 384/512; 74/424
(58) Field of Classification Search ............... 74/424; 384/512, 513, 461, 504
See application file for complete search history.

(56) References Cited

U.S. PATENT DOCUMENTS 5,655,844 A    8/1997   Takano

FOREIGN PATENT DOCUMENTS

| DE | 19839481 | 3/2000 |
|----|----------|--------|
| JP | 66327/1993 | 9/1993 |
| JP | 8-219052 | 8/1996 |
| WO | WO 93/17251 | 9/1993 |
| WO | WO- 00/12916 | 3/2000 |

*Primary Examiner*—William C. Joyce
(74) *Attorney, Agent, or Firm*—Jordan and Hamburg LLP

(57) ABSTRACT

A ball bearing with double raceway rotatably supports a pinion shaft having a pinion gear on its one end. This ball bearing with double raceway is provided with: an outer ring member having a large-diameter raceway surface and a small-diameter raceway surface; an inner ring member having a large-diameter raceway surface and a small-diameter raceway surface that correspond to the large-diameter raceway surface and the small-diameter raceway surface of the outer ring member; a large-diameter-side row of balls that are interpolated between the two large-diameter raceway surfaces; a small-diameter-side row of balls that are interpolated between the two small-diameter raceway surfaces; a large-diameter-side cage that holds the large-diameter-side row of balls; and a small-diameter-side cage that holds the small-diameter-side row of balls. In this ball bearing with double raceway, the row of balls on the anti-pinion gear side of the two rows of balls is subjected to a load prior to the row of balls on the pinion gear side.

10 Claims, 16 Drawing Sheets

F I G. 3
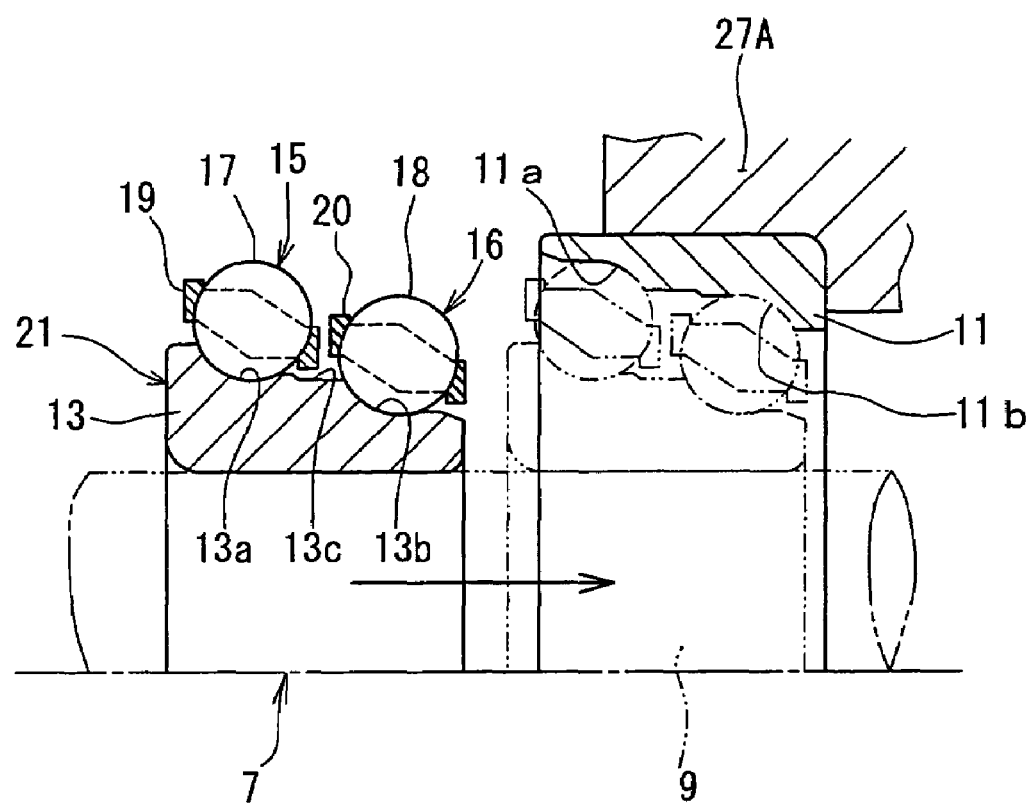

F I G. 12
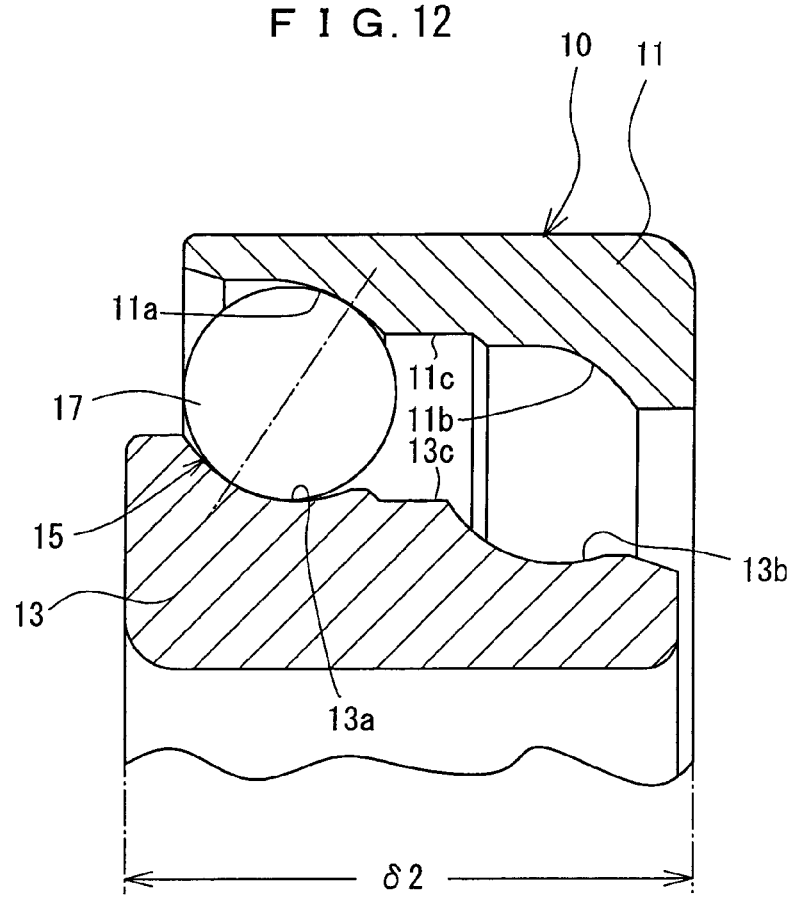
F I G. 13
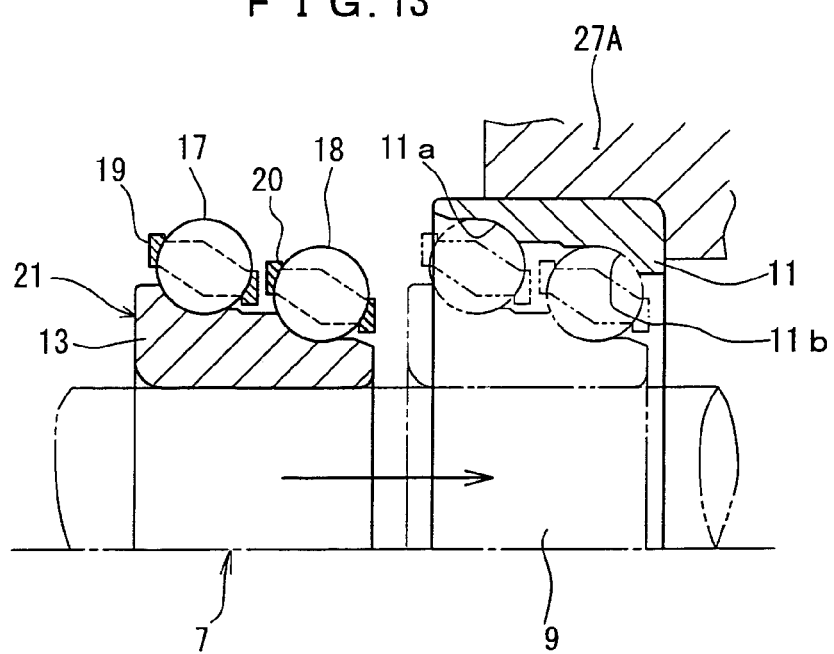

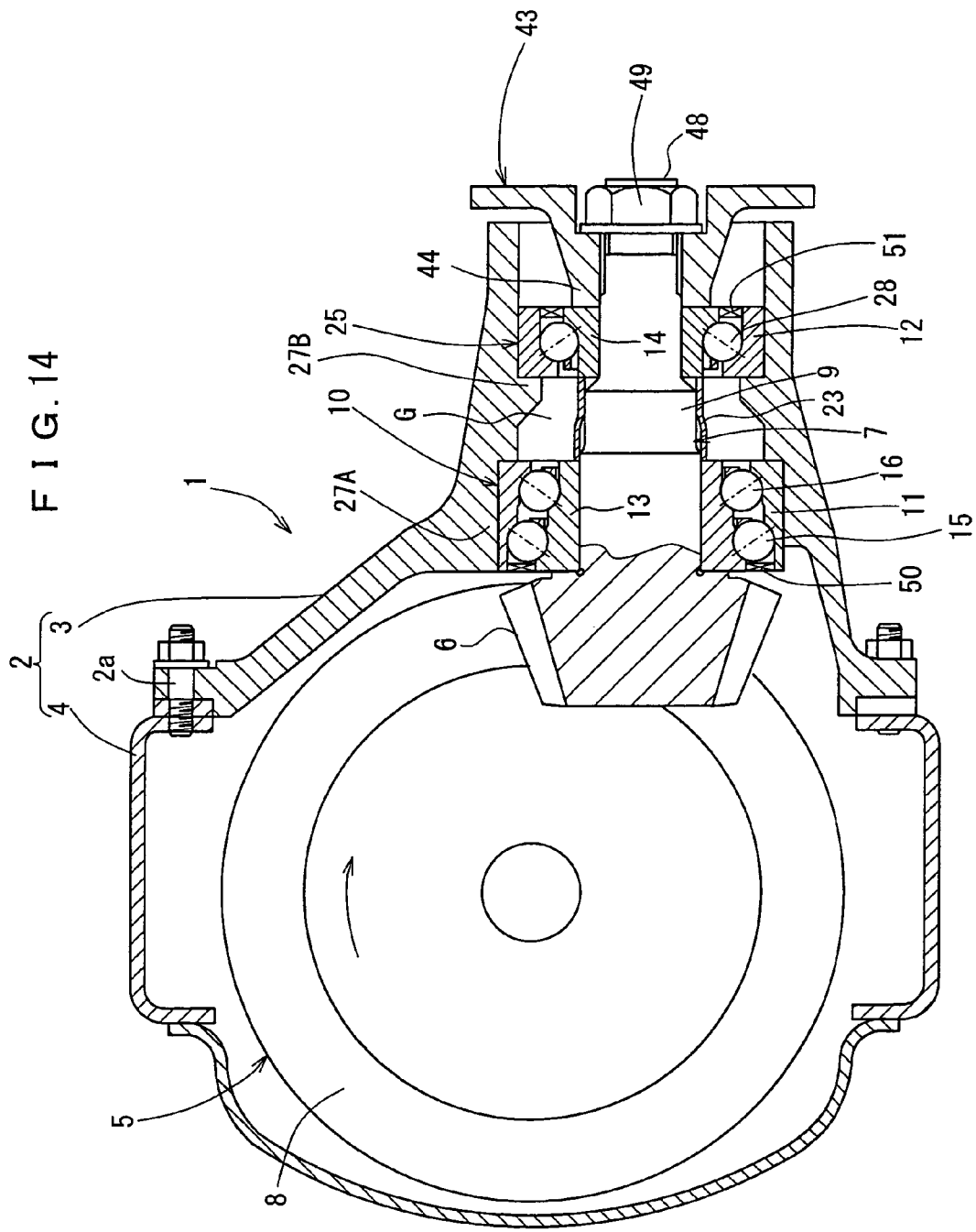
F I G. 14

DOUBLE-ROW BALL BEARING AND BEARING DEVICE FOR SUPPORTING PINION SHAFT

FIELD OF THE INVENTION

The present invention relates to a ball bearing with double raceway, and more particularly concerns the ball bearing with double raceway that is used for rotatably supporting a pinion shaft that is installed in a differential device in an automobile, a four-wheel-driving-use transfer device and the like.

BACKGROUND OF THE INVENTION

Referring to FIG. 21, the following description discusses a structure of a conventional differential device 100. The differential device 100 is provided with a pinion shaft (drive pinion) 102 placed in its differential case 101, and this pinion shaft 102 has on one axial end thereof a pinion gear 106 that is engaged with a ring gear 108 of a differential transmission mechanism 107. The pinion shaft 102 is supported so as to freely rotate around its axis by tapered roller bearings 103 and 104 with single raceway that are placed in a manner so as to separate axially from each other. A companion flange 105, which is connected to a propeller shaft, not shown, is attached to the other axial end of the pinion shaft 102.

In the differential device 100, a bearing device, which rotatably supports the pinion shaft 102, is constituted by the tapered roller bearings 103 and 104 that rotatably support the pinion shaft 102 on its half way.

In the differential device 100 having such arrangement, since the rolling elements of the tapered roller bearings 103 and 104 are rollers, a greater frictional resistance is exerted on the tapered roller bearing 103 particularly on the pinion gear 106 side having a greater thrust load. For this reason, the rotary torque becomes greater, resulting in degradation in the efficiency of the differential device 100.

DISCLOSURE OF THE INVENTION (1) The ball bearing with double raceway of the present invention is used for rotatably supporting a pinion shaft having a pinion gear on its one end. This bearing is provided with an outer ring member having a large-diameter raceway surface and a small-diameter raceway surface in an axial direction, an inner ring member that is placed coaxially with the outer ring and has a large-diameter raceway surface and a small-diameter raceway surface in the axial direction, which correspond to the large-diameter raceway surface and the small-diameter raceway surface of the outer ring member, a large-diameter-side row of balls that are interpolated between the two large-diameter raceway surfaces, a small-diameter-side row of balls that are interpolated between the two small-diameter raceway surfaces, a large-diameter side cage that holds the large-diameter side row of balls, and a small-diameter side cage that holds the small-diameter side row of balls. In this ball bearing with double raceway, the internal clearances on the two large-diameter raceway surfaces side as well as on the two small-diameter raceway surfaces side are designed to have respectively different sizes in such a manner that upon applying a load on the pinion shaft, the row of balls on the anti-pinion gear side of the two rows of balls is subjected to the load prior to the row of balls on the pinion gear side.

In the above structure, the rolling elements of the bearing for supporting the pinion shaft are constituted by a row of balls; therefore, even on the pinion gear side that is subjected to a particularly great thrust load, a great frictional resistance is not exerted, and the rotary torque is consequently reduced so that, upon application of the pinion shaft to a differential device, it becomes possible to prevent a reduction in the efficiency thereof. However, in the case of a ball bearing with double raceway, the service life of the ball bearing with double raceway becomes shorter than that of the tapered ball bearing. For this reason, the inventors of the present invention have studied vigorously to find that there is an imbalanced imposed load between the row of balls on the pinion gear side and the row of balls on the anti-pinion gear side, with the result that the subsequent adverse effect shortens the service life of the two rows of balls; thus, the present invention has been devised.

In other words, different from a structure in which the ball bearing with double raceway is simply applied to the pinion shaft, the present invention is characterized by a structure in which the internal clearances on the two large-diameter raceway surfaces side as well as on the two small-diameter raceway surfaces side are designed to have respectively different sizes in such a manner that upon applying a load on the pinion shaft, the row of balls on the anti-pinion gear side of the two rows of balls is subjected to the load prior to the row of balls on the pinion gear side. With this structure having such features, when a load is applied to the pinion shaft, first, the internal clearance in the row of balls on the anti-pinion gear side is narrowed so that the load is mainly supported by the row of balls on the anti-pinion gear side, and upon receipt of a higher load, the internal clearance in the row of balls on the pinion gear side is narrowed so that the load is shared between the rows of balls in a manner so as to support the load by using the row of balls on the pinion gear side. Therefore, the service lives of the two rows of balls are averaged in a well-balanced manner so that the service life of the entire bearing is lengthened; thus, when the bearing is applied to the differential device, it becomes possible to provide high efficiency for a long time.

In the present invention, with respect to the internal clearances, the radial internal clearance on the anti-pinion gear side may be made smaller than the radial internal clearance on the pinion gear side, or the axial internal clearance on the anti-pinion gear side may be made smaller than the axial internal clearance on the pinion gear side.

BRIEF DESCRIPTION OF THE DRAWINGS

FIG. 3 is a cross-sectional view that shows a state in which a ball bearing with double raceway is being assembled therein.

FIG. 12 is a cross-sectional view that shows a unit width of a ball bearing with double raceway of the pinion-shaft-supporting bearing device of FIG. 8.

FIG. 13 is a cross-sectional view that shows a state in which a ball bearing with double raceway of the pinion-shaft-supporting bearing device is being assembled therein.

FIG. 14 is a cross-sectional view showing an entire structure of a differential device according to still another embodiment of the present invention.

BEST MODE FOR CARRYING OUT THE INVENTION

The following description discusses a ball bearing with double raceway in accordance with the most preferable embodiment of the present invention, when it is applied to a pinion-shaft-supporting bearing device in a differential device to be installed in a vehicle.

Figure 1:
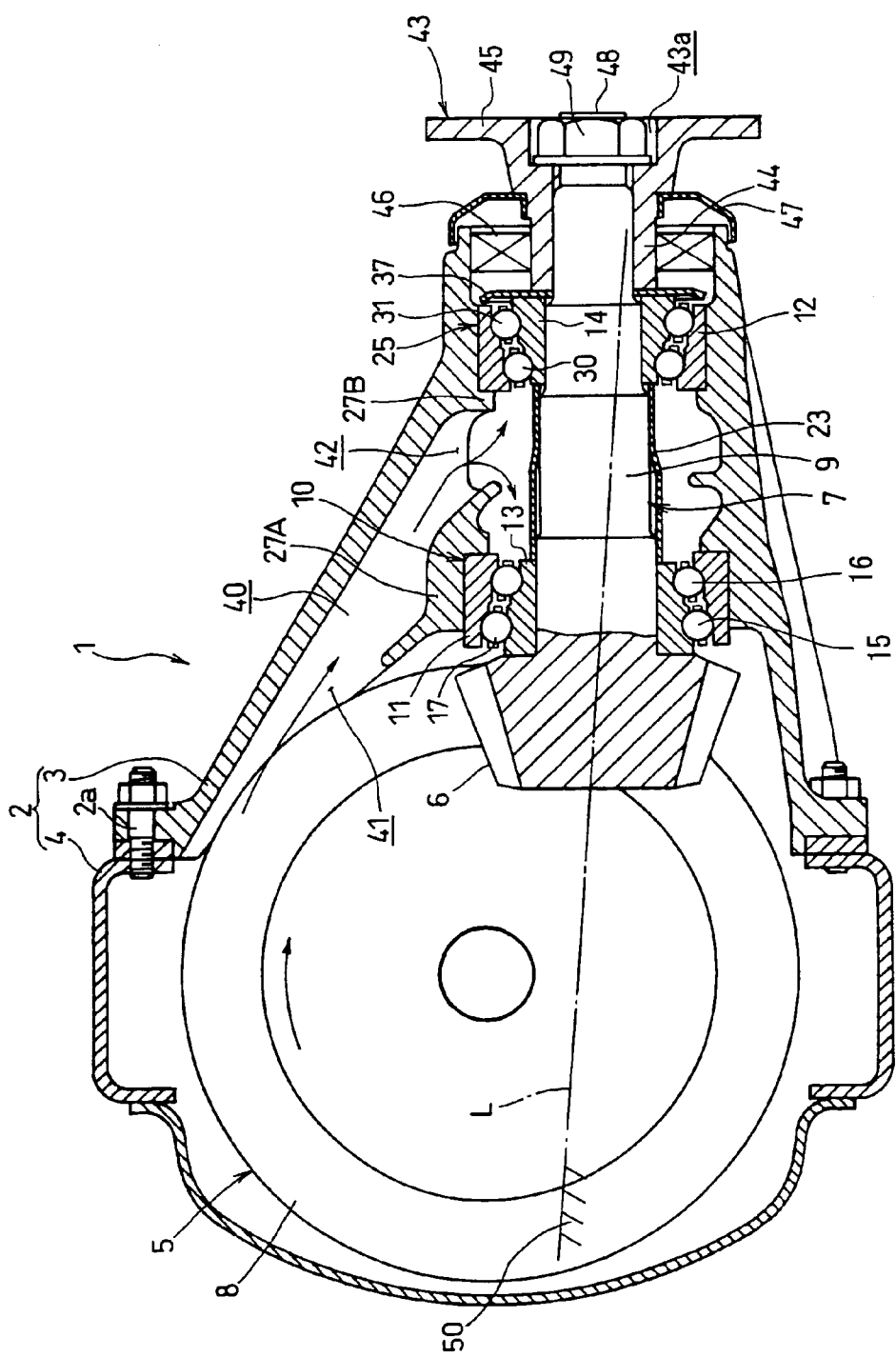
FIG. 1 is a cross-sectional view showing an entire structure of a differential device according to most preferable embodiment of the present invention.
Figure 2:
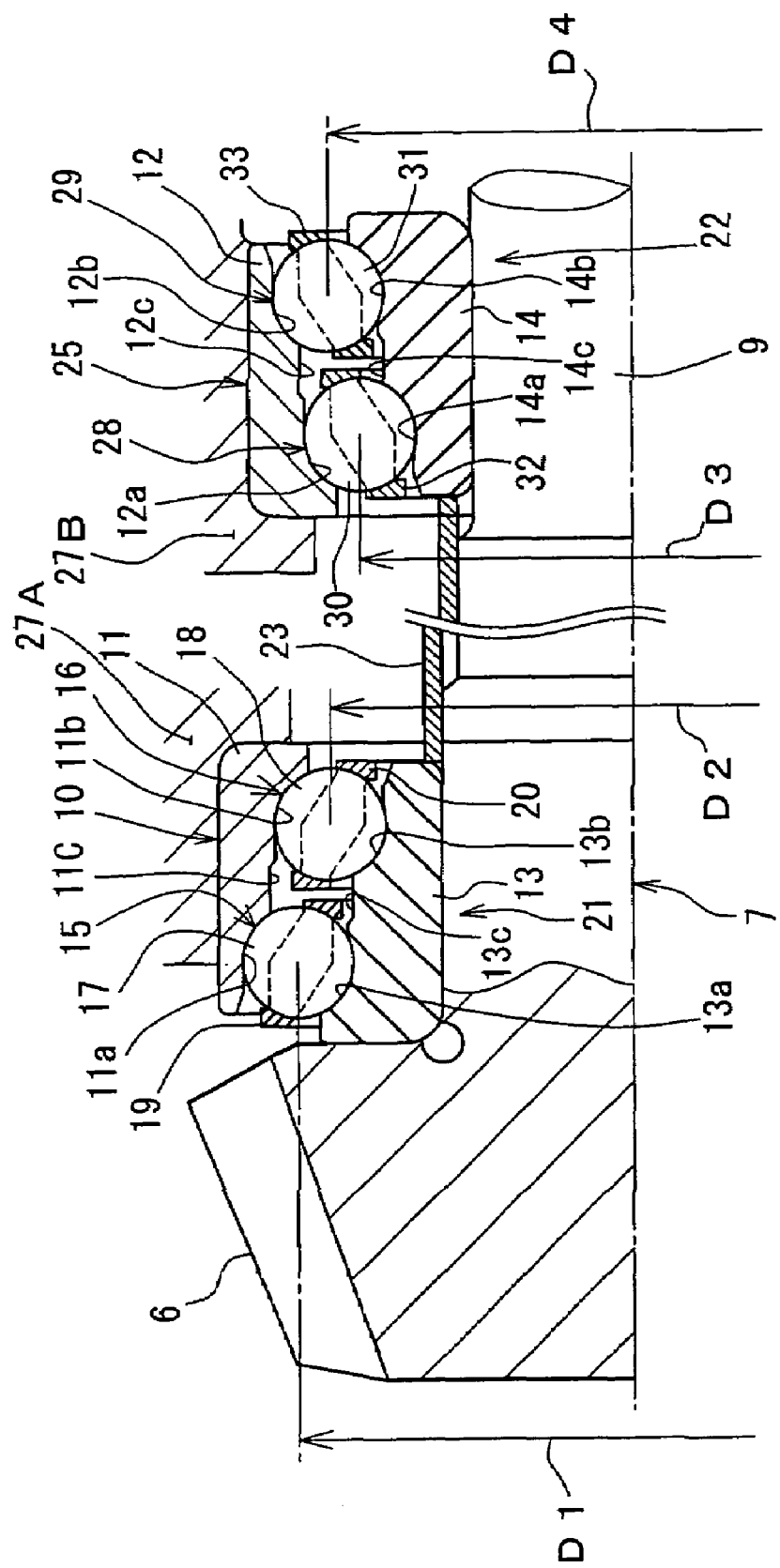
FIG. 2 is an enlarged cross-sectional view that shows an essential portion of the device.
Figure 4:
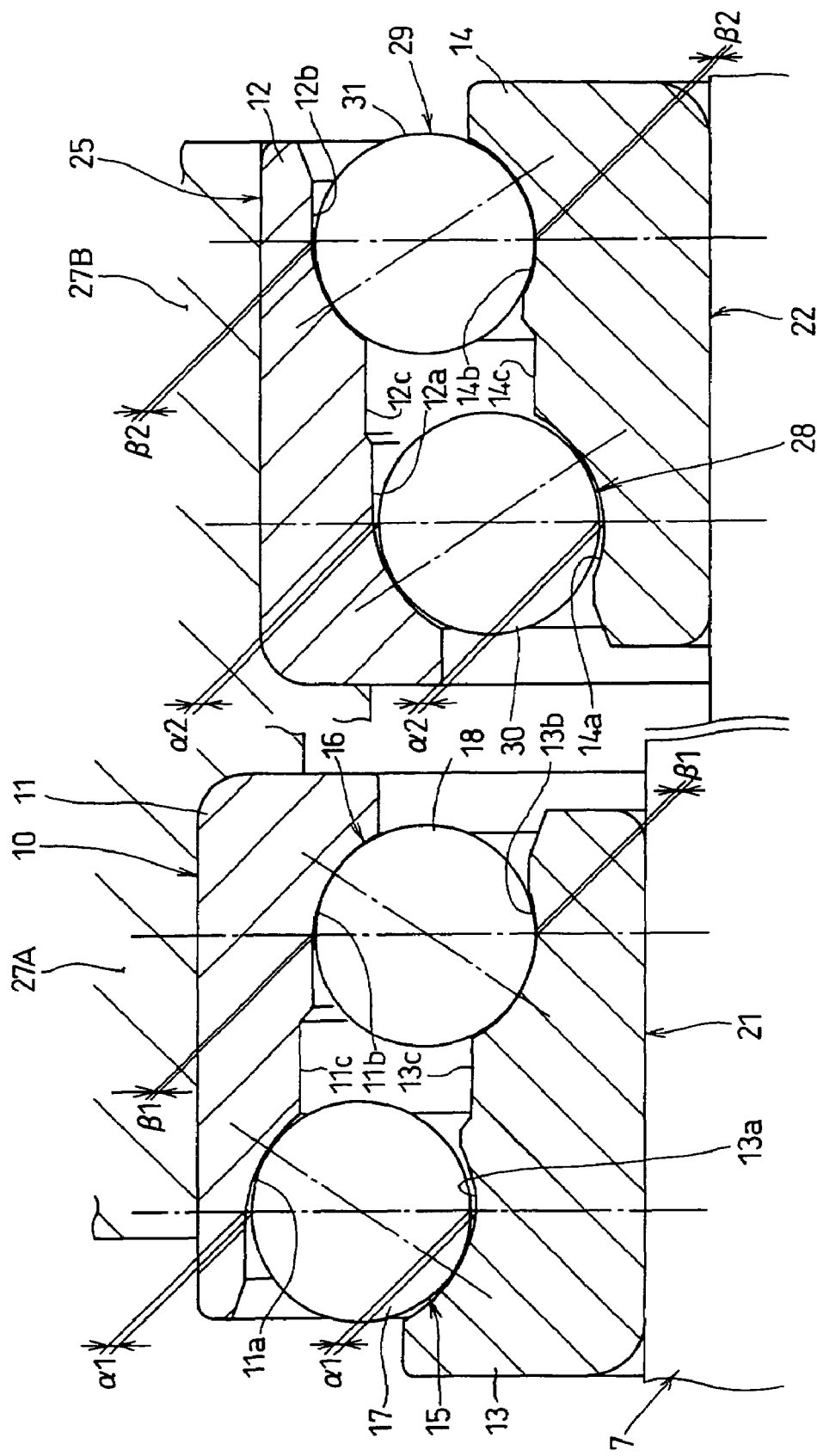
FIG. 4 is an enlarged cross-sectional view that shows a radial internal clearance in the ball bearing.
Figure 5:
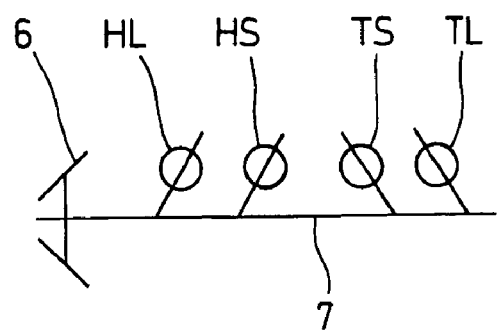
FIG. 5 is a linearized drawing that shows a state in which the respective ball bearings are attached to a pinion shaft.
Figure 6:
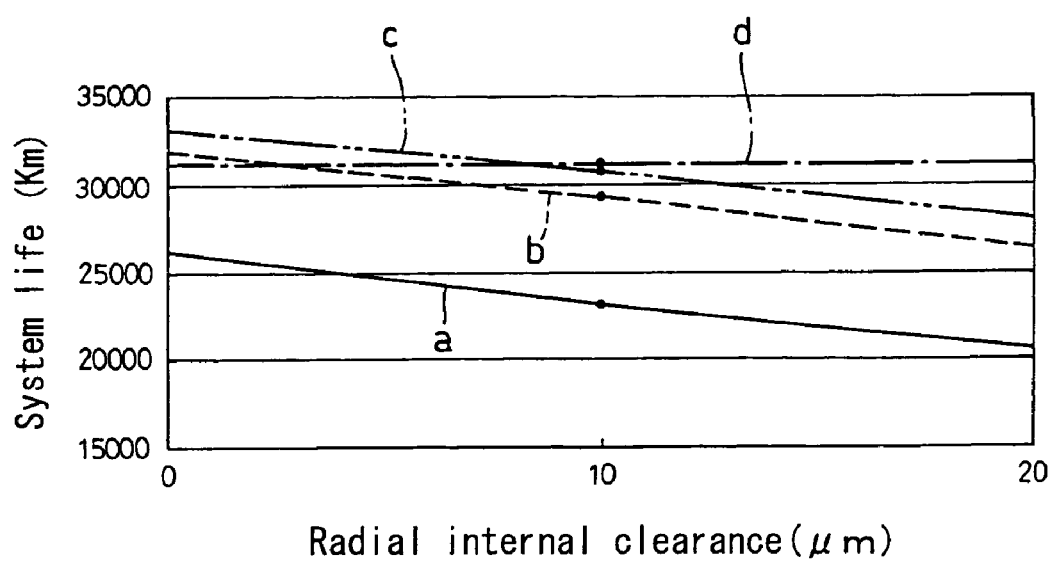
FIG. 6 is a graph in which the abscissa axis represents the radial internal clearance and the ordinate axis represents the system service life.
Figure 7:
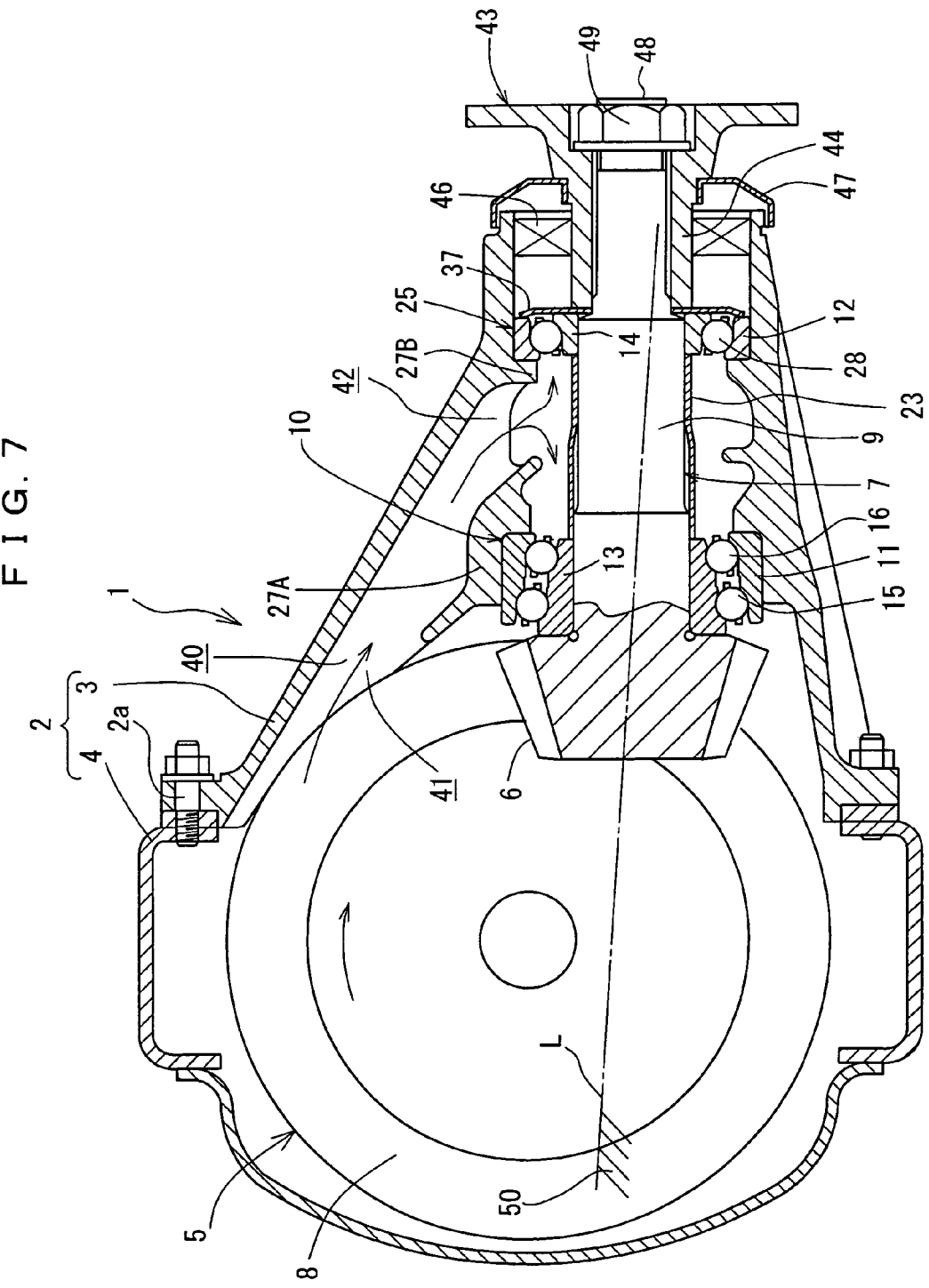
FIG. 7 is a cross-sectional view showing an entire structure of a differential device according to another embodiment of the present invention.

Here, FIG. 1 is a cross-sectional view showing a schematic structure of a differential device, FIG. 2 is an enlarged cross-sectional view thereof, FIG. 3 is a cross-sectional view that shows a state in which a ball bearing with double raceway is being assembled therein, FIG. 4 is an enlarged cross-sectional view that shows a radial internal clearance in the ball bearing with double raceway, FIG. 5 is a line drawing that shows a state in which the respective ball bearings with double race way are attached to a pinion shaft, and FIG. 6 is a graph in which the axis of abscissas represents the radial internal clearance and the axis of ordinates represents the system service life.

As shown in FIG. 1, a differential device 1 has a differential case 2. This differential case 2 is constituted by a front case 3 and a rear case 4. The front case 3 and the rear case 4 are attached by bolt and nut 2a to each other. Annular walls 27A and 27B used for attaching bearings are formed inside the front case 3. The differential case 2 has a differential transmission mechanism 5 that differentially drives right and left wheels in corporation with each other and a pinion shaft (drive pinion) 7 having a pinion gear 6 attached to one end thereof, which are installed therein. The pinion gear 6 is meshed with a ring gear 8 of the differential transmission mechanism 5. The shaft portion 9 of the pinion shaft 7 is formed into a stepped shape with the other end having a smaller diameter than the one end.

The shaft portion 9 of the pinion shaft 7 has its one end rotatably supported on the annular wall 27A formed on the front case 3 through a ball bearing with double raceway 10 around its axis. The shaft portion 9 of the pinion shaft 7 has the other end thereof rotatably supported on the annular wall 27B of the front case 3 through a ball bearing with double raceway 25 around its axis.

As shown in FIG. 2, the ball bearing with double raceway 10 is constituted by an outer ring member 11 having a large-diameter raceway surface 11a on the pinion side and a small-diameter raceway surface 11b on the anti-pinion side and a first unit member 21. The first unit member 21 is attached to the outer ring member 11 in the axial direction from the pinion side toward the anti-pinion side. The outer ring member 11 is fitted to the inner circumferential face of the annular wall 27A. The outer ring member 11 is prepared as a counter-bored outer ring. A flat face portion 11c that has a diameter larger than the small-diameter raceway surface 11b and is continuously connected to the large-diameter raceway surface 11a is formed between the large-diameter raceway surface 11a and the small-diameter raceway surface 11b of the outer ring member 11. With this arrangement, the inner circumferential face of the outer ring member 11 is formed into a stepped shape.

As shown in FIG. 3, the first unit member 21 is constituted by an inner ring member 13 having a large-diameter raceway surface 13a that faces the large-diameter raceway surface 11a of the outer ring member 11 in the radial direction and a small-diameter raceway surface 13b that faces the small-diameter raceway surface 11b thereof in the radial direction, and cages 19 and 20 that hold balls 17 and 18 respectively constituting a large-diameter-side row of balls 15 on the pinion side and a small-diameter-side row of balls 16 on the anti-pinion side.

The inner ring member 13 is prepared as a counter-bored inner ring. The inner ring member 13 is inserted through the pinion shaft 7. One axial end face of the inner ring member 13 is made in contact with an end face of the pinion gear 6 in the axial direction. The inner ring member 13 is sandwiched in the axial direction, between the end face of the pinion gear 6 and a plastic spacer 23 that is externally fitted to the shaft portion 9 of the pinion shaft 7 on its half way, and that is used for setting a pre-load.

A flat face portion 13c that has a diameter larger than the small-diameter raceway surface 13b and is continuously connected to the large-diameter raceway surface 13a is formed between the large-diameter raceway surface 13a and the small-diameter raceway surface 13b of the inner ring member 13. With this arrangement, the outer circumferential face of the inner ring member 13 is formed into a stepped shape.

As shown in FIG. 4, the large-diameter-side row of balls 15 is placed between the large-diameter raceway surface 11a and the large-diameter raceway surface 13a with a predetermined radial internal clearance $\alpha 1$. The small-diameter-side row of balls 16 is placed between the small-diameter raceway surface 11b and the small-diameter raceway surface 13b with a predetermined radial internal clearance β1 that is smaller than a radial inner diameter clearance α1.

In the ball bearing with double raceway 10, the diameter of each ball 17 of the large-diameter-side row of balls 15 and the diameter of each ball 18 of the small-diameter-side row of balls 16 are made equal to each other. The pitch circle diameters D1 and D2 of the respective rows of balls 15 and 16 are different from each other. The pitch circle diameter D1 of the large-diameter-side row of balls 15 is made greater than the pitch circle diameter D2 of the small-diameter-side row of balls 16. The ball bearing with double raceway 10 having the rows of balls 15 and 16 that have the different pitch circle diameters D1 and D2 is particularly referred to as a tandem-type ball bearing with double raceway.

As shown in FIG. 2, the ball bearing with double raceway 25 is constituted by an outer ring member 12 having a small-diameter raceway surface 12a on the pinion side and a large-diameter raceway surface 12b on the anti-pinion side and a second unit member 22. The second unit member 22 is attached to the outer ring member 12 in the axial direction from the anti-pinion side toward the pinion side. In the outer ring member 12, a flat face portion 12c that has a diameter larger than that of the small-diameter raceway surface 12b and is continuously connected to the large-diameter raceway surface 12a is formed between the large-diameter raceway surface 12a and the small-diameter raceway surface 12b. With this arrangement, the inner circumferential face of the outer ring member 12 of the ball bearing with double raceway 25 is formed into a stepped shape. The outer ring member 12 is fitted to the inner circumferential face of the annular wall 27B. The outer ring member 12 is prepared as a counter-bored outer ring.

The second unit member 22 is constituted by an inner ring member 14 having a small-diameter raceway surface 14a that faces the small-diameter raceway surface 12a of the outer ring member 12 in the radial direction and a large-diameter raceway surface 14b that faces the large-diameter raceway surface 12b thereof in the radial direction, a small-diameter-side row of balls 28 on the pinion side as well as a large-diameter-side row of balls 29 on the anti-pinion side, and cages 32 and 33 that hold balls 30 and 31 respectively constituting the respective rows of balls 28 and 29 in a manner so as to be evenly distributed in the circumferential direction. The inner ring member 14 is prepared as a counter-bored inner ring. The inner ring member 14 is inserted through the pinion shaft 7, and the inner ring member 14 is sandwiched by a plastic spacer 23 used for setting a pre-load and the shielding plate 37 in the axial direction.

A flat face portion 14c, which has a diameter smaller than that of the large-diameter raceway surface 14b, and is continuously connected to the small-diameter raceway surface 14a, is formed between the small-diameter raceway face 14a and the large-diameter raceway surface 14b. With this arrangement, the outer circumferential face of the first inner ring member 14 is formed into a stepped shape.

As shown in FIG. 4, the small-diameter-side row of balls 28 are placed between the small-diameter raceway surface 12a and the small-diameter raceway surface 14a with a predetermined radial internal clearance α2. The large-diameter-side row of balls 29 are placed between the large-diameter raceway surface 12b and the large-diameter raceway surface 14b with a predetermined radial internal clearance β2 that is smaller than the predetermined radial inner diameter clearance α2.

In the ball bearing with double raceway 25, the diameter of each ball 30 of the small-diameter-side row of balls 28 and the diameter of each ball 31 of the large-diameter-side row of balls 29 are made equal to each other. The pitch circle diameters D3 and D4 of the respective rows of balls 28 and 29 are different from each other. The pitch circle diameter D3 of the small-diameter-side row of balls 28 is made smaller than the pitch circle diameter D4 of the large-diameter-side row of balls 29. The ball bearing with double raceway 25 is also prepared as a tandem-type ball bearing with double raceway.

An oil circulating path 40 is formed between an outer wall and the annular wall 27A of the front case 3. An oil inlet 41 of the oil circulating path 40 has its opening on the ring gear 8 side of the oil circulating path 40. An oil outlet 42 of the oil circulating path 40 has its opening between the annular wall 27A and the annular wall 27B.

The differential device 1 has a companion flange 43. This companion flange 43 has a trunk portion 44 and a flange portion 45 that is integrally formed with the trunk portion 44. The trunk portion 44 of the companion flange 43 is externally attached to the other side of a shaft portion 9 of the pinion shaft 7, that is, the drive shaft side, not shown. A shielding plate 37 is interpolated between one end face 14 of the trunk portion 44 of the companion flange 43 and an end face of an inner ring member 14 of a ball bearing with double raceway 25. An oil seal 46 is placed between the outer circumferential face of the trunk portion 44 of the companion flange 43 and the inner circumferential face of the opening on the other side of the front case 3. A seal protecting cup 47 to be used for covering the oil seal 46 is attached to the opening on the other side of the front case 3. A thread portion 48 is formed on the outer end on the other side of the shaft portion 9. The thread portion 48 protrudes into a center recessed section 43a of the flange portion 45. A nut 49 is meshed with the thread portion 48.

The nut 49 is meshed with the thread portion 48 so that the inner ring members 13 and 14 of the respective ball bearings with double raceway 10 and 25 are sandwiched by the end face of the pinion gear 6 and the end face of the companion flange 43 in the axial direction so that a predetermined pre-load is applied to the ball bearings with double raceway 10 and 25 through the shielding plate 37 and a plastic spacer 23.

In the differential device 1 having the arrangement, lubricating oil 50 is stored inside the differential case 2 so as to be maintained at a level L in a driving-stop state. The oil 50 is splashed up as the ring gear 8 rotates upon driving so that the oil is directed and supplied between the ball bearings with double raceway 10 and 25 through the oil circulating path 40 inside the front case 3 to lubricate the ball bearings with double race way 10 and 25, and is again circulated through the inside of the differential case 2. This system which lubricates the bearing by circulating the oil 50 through the inside of the differential case 2 is referred to as an oil lubricating type.

The following description discusses an assembling method of the differential device 1.

Upon assembling the differential device 1, the ball bearing with double raceway 10 is preliminarily assembled in such a manner that the radial internal clearance α1 between the large-diameter-side row of balls 15 and the large-diameter raceway surface 11a of the outer ring member 11 as well as the large-diameter raceway surface 13a of the inner ring member 13 is adjusted. Moreover, the radial internal clearance β1 between the small-diameter-side row of balls 16 and the small-diameter raceway surface 11b of the outer ring member 11 as well as the small-diameter raceway surface 13b of the inner ring member 13 is adjusted. At this time, the radial internal clearances α1 and β1 are controlled so that the radial internal clearance β1 is made smaller than the radial internal clearance α1.

Upon assembling the differential device 1, the ball bearing with double raceway 25 is preliminarily assembled in such a manner that the radial internal clearance α2 between the small-diameter-side row of balls 28 and the small-diameter raceway surface 12a of the outer ring member 12 as well as the small-diameter raceway surface 14a of the inner ring member 14 is adjusted. Moreover, the radial internal clearance β2 between the large-diameter-side row of balls 29 and the large-diameter raceway surface 12b of the outer ring member 12 as well as the large-diameter raceway surface 14b of the inner ring member 14 is adjusted. At this time, the radial internal clearances α2 and β2 are controlled so that the radial internal clearance β2 is made smaller than the radial internal clearance α2.

Moreover, the respective outer ring members 11 and 12 of the ball bearings with double raceway 10 and 25 are preliminarily press-inserted into the annular walls 27A and 27B. In a separated manner from this process, the inner ring member 13 of the first unit member 21 of the ball bearing with double raceway 10 is inserted through the pinion shaft 7 so that the first unit member 21 is positioned on the pinion gear 6 side of the shaft portion 9 of the pinion shaft 7.

Next, in a state where the front case 3 and the rear case 4 are still separated from each other, the outer ring member 11 of the ball bearing with double raceway 10 is assembled into the front case 3. At this time, the outer ring member 11 is press-inserted to a predetermined position in the axial direction at which it comes into contact with the step portion formed in the annular wall 27A from one end opening of the front case 3. Further, the outer ring member 12 of the ball bearing with double raceway 25 is press-inserted to a predetermined position in the axial direction at which it comes into contact with the step portion formed in the annular wall 27B from the other end opening of the front case 3.

As described above, the pinion shaft 7 to which the first unit member 21 has been attached is inserted from the small diameter side, that is, from the one end opening of the front case 3, so that the balls 18 of the small-diameter-side row of balls 16 of the first unit member 21 are fitted to the smaller-diameter raceway surface 11b of the outer ring member 11 and the balls 17 of the large-diameter-side row of balls 15 of the first unit member 21 are fitted to the large-diameter raceway surface 11a of the outer ring member 11.

Next, the plastic spacer 23 is externally fitted and inserted to the shaft portion 9 of the pinion shaft 7 from the other end opening of the front case 3. Successively, the inner ring member 14 of the second unit member 22 is inserted and attached to the shaft portion 9 of the pinion shaft 7 from the other end opening of the front case 3.

Thereafter, the shielding plate 37 is inserted to the shaft portion 9 of the pinion shaft 7 from the other end opening of the front case 3, and the oil seal 46 is attached thereto and the seal protective cup 47 is attached to the other end opening of the front case 3 so that the trunk portion 44 of the companion flange 43 is inserted through the seal protective cup 47 with its end face being made in contact with the shielding plate 37. Successively, the nut 49 is engaged with the threaded portion 48 of the shaft portion 9. Thus, the balls 17 and 18 of the first unit member 21 and the balls 30 and 31 of the second unit member 22 are respectively subjected to predetermined pre-loads. Since the large-diameter-side row of balls 15 and the smaller-diameter-side row of balls 28 are respectively placed on the pinion side in the ball bearings with double raceway 10 and 25, these are subjected to a greater load in comparison with the small-diameter-side row of balls 16 and the large-diameter-side row of balls 29.

Here, in the case when the large-diameter-side row of balls 15 and the small-diameter-side row of balls 16 are respectively indicated by HL and HS, with the small-diameter-side row of balls 28 and the large-diameter-side row of balls 29 being respectively indicated by TS and TL, Table 1 shows relationships between the radial internal clearances in the respective rows of balls 15, 16, 28, 29 and the system life.

TABLE 1

| Rows of balls with pre-load | | Rows of balls without pre-load | | Radial clearance (μm) α1, α2, β1, β2 | | |
| --- | --- | --- | --- | --- | --- | --- |
| | | | | 0 | 10 | 20 |
| | | | | System life (km) | | |
| HL | TL | HS | TS | 26254 | 23248 | 20716 |
| HS | TS | HL | TL | 31915 | 29411 | 26531 |
| HS | TL | HL | TS | 33155 | 30921 | 28228 |
| | | HL | HS | 31214 | 31214 | 31214 |
| | | TS | TL | | | |

FIG. 6 shows a graph obtained when the radial internal clearances, α1, α2, β1 and β2 (μm), are plotted on the axis of abscissas with the system life (km) being plotted on the axis of ordinates. In this figure, solid line a indicates cases in which a pre-load is applied to HL and TL (with no pre-load applied to HS and TS), broken line b indicates cases in which a pre-load is applied to HS and TS (with no pre-load applied to HL and TL), two-dot chain line c indicates cases in which a pre-load is applied to HS and TL (with no pre-load applied to HL and TS), and one-dot chain line d indicates cases in which no pre-load is applied to any of HL, HS, TS and TL.

As shown in Table 1 and FIG. 6, it is found that, when a case in which no pre-load is applied to any of HL, HS, TS and TL is taken as a reference, the case (indicated by the two-dot chain line c) in which a pre-load is applied to HS (small-diameter-side row of balls 16) and TL (large-diameter-side row of balls 29) with no pre-load being applied to any of HL (large-diameter-side row of balls 15) and TS (small-diameter-side row of balls 28) provides the longest system life.

As described above, HL and TS correspond to the large-diameter-side row of balls 15 and the small-diameter-side row of balls 28 located on the pinion side in the respective ball bearings with double raceway 10 and 25, and HS and TL correspond to the small-diameter-side row of balls 16 and the large-diameter-side row of balls 29 located on the anti-pinion side in the respective ball bearings with double raceway 10 and 25. When the ball bearings with double raceway 10 and 25 are applied to the differential device 1, HL (the large-diameter-side row of balls 15) and TS (the small-diameter-side row of balls 28) are subjected to severer load conditions in comparison with HS (the small-diameter-side row of balls 16) and TL (the large-diameter-side row of balls 29). Therefore, by making the radial internal clearances α1 and α2 of the large-diameter-side row of balls 15 and the small-diameter-side row of balls 28 greater than the radial internal clearances β1 and β2 of the small-diameter-side row of balls 16 and the large-diameter-side row of balls 29, the load is first imposed on the small-diameter-side row of balls 16 and the large-diameter-side row of balls 29 upon receipt of a load on the respective ball bearings with double raceway 10 and 25. Upon receipt of a greater load, the radial internal clearances α1 and α2 of the large-diameter-side row of balls 15 and the small-diameter-side row of balls 28 are narrowed to receive the load so that the imposed load is thus shared by the large-diameter-side row of balls 15 and the small-diameter-side row of balls 28 as well as the small-diameter-side row of balls 16 and the large-diameter-side row of balls 29. Even when such a great load is exerted on the pinion shaft 7, the imposed load is shared by the respective rows of balls 15 and 16 so that the system life of each of the ball bearings with double raceway 10 and 25 is lengthened, in particular, the life of each of the large-diameter-side row of balls 15 and the small-diameter-side row of balls 28 is lengthened.

Here, Table 1 and FIG. 6 show that, when the values of the radial internal clearances α1 and α2 reach 20 µm, the system life is shortened. For this reason, the radial internal clearances α1 and α2 are preferably suppressed to values of 10 µm or less.

Moreover, in this embodiment, with respect to the ball bearing on the pinion gear 6 side that is subjected to a greater load in comparison with the anti-pinion 6 side, a ball bearing with double raceway 10 having a smaller frictional resistance is used. With this arrangement, in comparison with a conventional tapered roller bearing, the rotary torque is reduced, thereby making it possible to improve the efficiency of the differential device 1. Moreover, by using not a ball bearing with single raceway, but a ball bearing with double raceway, the load capacity is increased in comparison with the ball bearing with single raceway so that sufficient supporting rigidity is obtained.

In addition, with respect to the ball bearing with double raceway 10, a tandem-type ball bearing with double raceway in which the pitch circle diameter D1 of the small-diameter-side row of balls 15 on the pinion gear 6 side is made greater than the pitch circle diameter D2 of the large-diameter-side row of balls 16 is used so that, when the balls 17 and 18 of the two rows have the same diameter, the number of the balls 17 on the small-diameter-side row of balls 16 on the pinion gear 6 side to which a greater load is exerted is increased; thus, the load supporting capability required as the bearing is improved.

In the embodiment, the ball bearings with double raceway 10 and 25 are used in the pinion-shaft-supporting bearing device of the differential device 1 of a vehicle. However, the present invention is not limited to this embodiment. In other words, one of bearing rings, which is a constituent element of the ball bearing with double raceway, is preliminarily attached to one of the shaft and the housing, and the other constituent element of the ball bearing with double raceway is assembled to the other of the shaft and the housing, and in this arrangement, the shaft may be inserted to the housing; thus, the present invention can be applied to a device with this arrangement.

In the present invention, with respect to a rolling bearing with double raceway, arrangements having three or more rows of balls or a group of rollers may be used. In these cases also, the radial internal clearance between the rolling elements placed on the side subjected to a smaller load and the raceway surface thereof is preferably made smaller than the radial internal clearance between the rolling elements placed on the side subjected to a greater load and the raceway surface thereof.

As is clear from the above explanation, in accordance with the present invention, in particular, the lives of the balls in the ball bearing with double raceway are averaged so that the life of the entire rolling bearing with double raceway can be lengthened.

Another Embodiment

A rolling bearing with double raceway in accordance with another embodiment of the present invention is applied to a pinion-shaft-supporting bearing device of a differential device, and referring to FIGS. 7 to 13, the following description discusses the arrangement thereof.

In this embodiment, a ball bearing with single raceway 25 is used in place of the ball bearing with double raceway 25 in the embodiment shown in FIG. 1. Reference numeral 1 represents a differential device, 2 is a differential case, 3 is a front case, 4 is a rear case, 2a is bolt and nut 27A and 27B are annular walls, 5 is a differential transmission mechanism, 6 is a pinion gear, 7 is a pinion shaft, 8 is a ring gear, and 9 is a shaft portion of the pinion shaft 7. Reference numeral 10 represents a tandem-type ball bearing with double raceway, 40 is an oil circulating path, 41 is an oil inlet, and 42 is an oil outlet.

Figure 8:
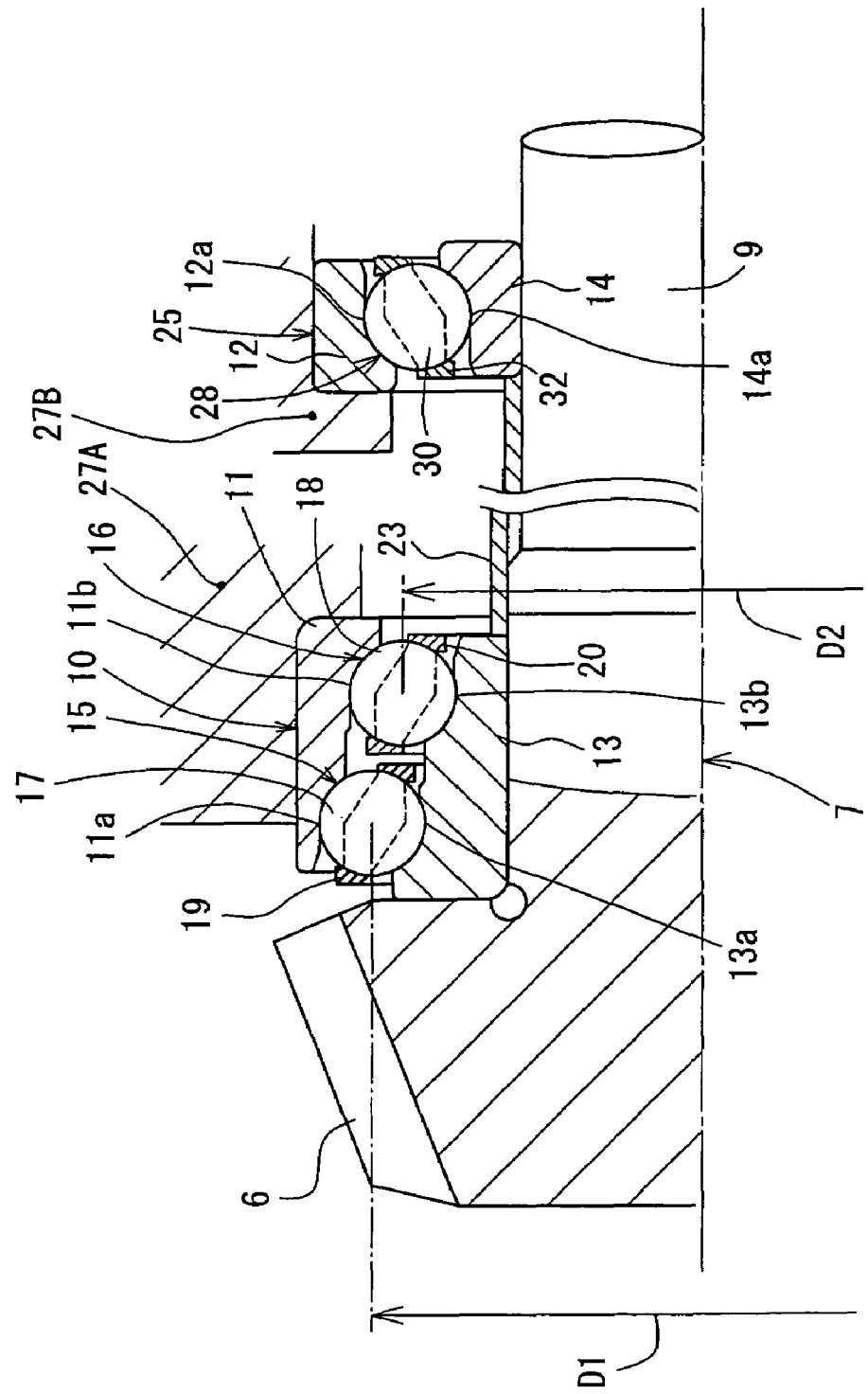
FIG. 8 is a cross-sectional view that shows a pinion-shaft-supporting bearing device of the differential device of FIG. 7.

Referring to FIG. 8, in the same manner as the structure shown in FIG. 2, the ball bearing with double raceway 10 is provided with an outer ring member 11 having a large-diameter raceway surface 11a on the pinion gear side and a small-diameter raceway surface 11b on the anti-pinion gear side, and an inner ring member 13 having a large-diameter raceway surface 13a that faces the large-diameter raceway surface 11a of the outer ring member 11 in the radial direction and a small-diameter raceway surface 13b that faces the small-diameter raceway surface 11b thereof in the radial direction, and cages 19 and 20 that hold balls 17 and 18 respectively constituting a large-diameter-side row of balls 15 on the pinion side and a small-diameter-side row of balls 16 on the anti-pinion side as rolling elements of double raceway in a manner so as to be located at evenly distributed positions in the circumferential direction.

Figure 9:
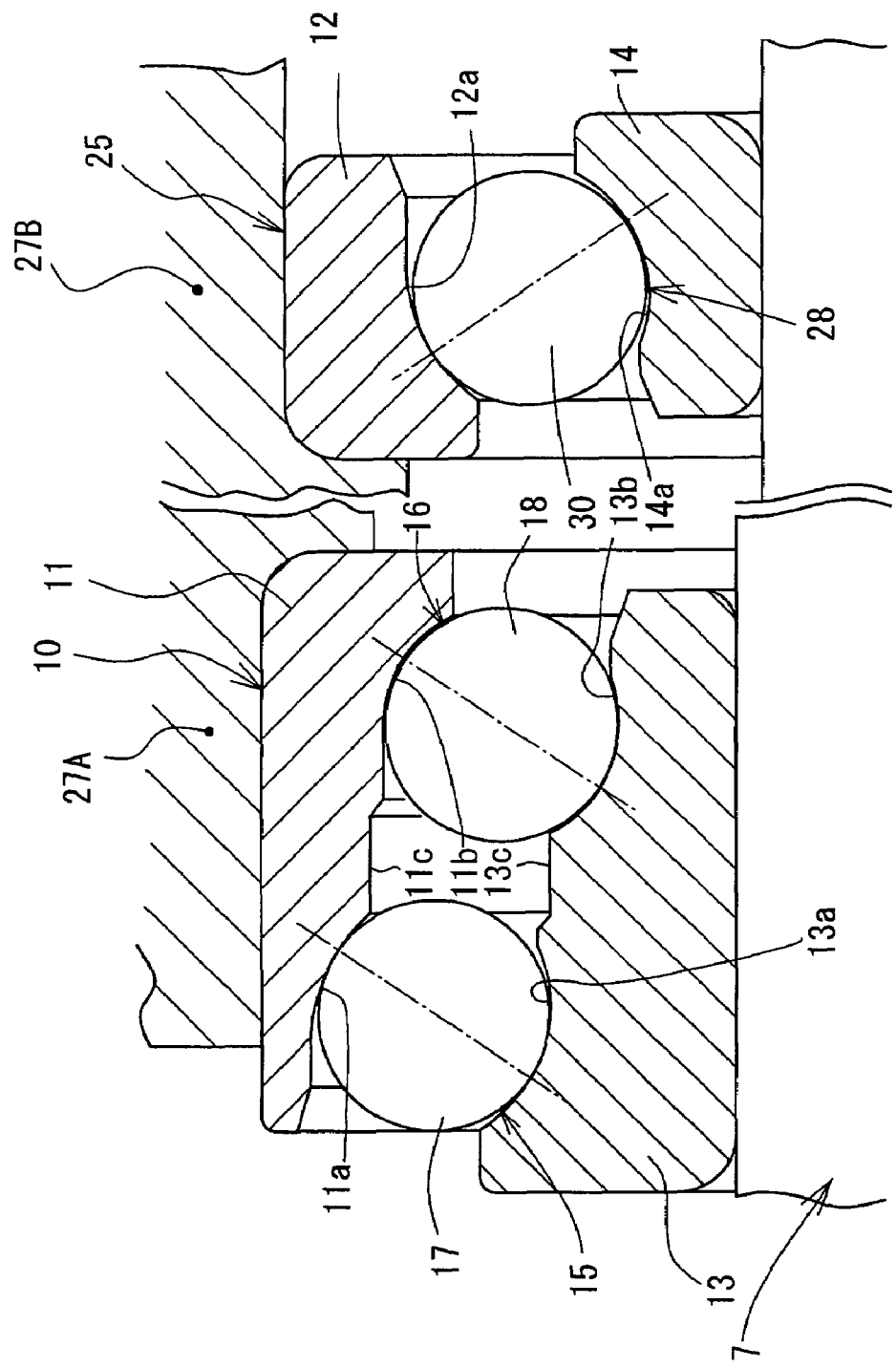
FIG. 9 is an enlarged cross-sectional view that shows the pinion-shaft-supporting bearing device of FIG. 8.

As shown in FIG. 9, the outer ring member 11 of the ball bearing with double raceway 10 is prepared as a counter-bored outer ring. A flat face portion 11c, which has a diameter greater than that of the small-diameter raceway surface 11b, and is continuously connected to the larger-diameter raceway surface 13a, is formed between the large-diameter raceway surface 11a and the small-diameter raceway surface 11b of the outer ring member 11. With this arrangement, the inner circumferential face of the outer ring member 11 is formed into a stepped shape.

The inner ring member 13 is prepared as a counter-bored inner ring. A flat face portion 13c, which has a diameter greater than that of the small-diameter raceway surface 13b, and is continuously connected to the larger-diameter raceway surface 13a, is formed between the large-diameter raceway surface 13a and the small-diameter raceway surface 13b of the inner ring member 13. With this arrangement, the outer circumferential face of the inner ring member 13 is formed into a stepped shape.

In the ball bearing with double raceway 10, the diameter of each ball 17 of the large-diameter-side row of balls 15 and the diameter of each ball 18 of the small-diameter-side row of balls 16 are equal to each other. The pitch circle diameters D1 and D2 of the respective rows of balls 15 and 16 are different from each other. The pitch circle diameter D1 of the large-diameter-side row of balls 15 is made greater than the pitch circle diameter D2 of the small-diameter-side row of balls 16. The ball bearing with double raceway 10 having the rows of balls 15 and 16 that have the different pitch circle diameters D1 and D2 is referred to as a tandem-type ball bearing with double raceway.

The ball bearing with single raceway 25, which is an angular ball bearing with single raceway, is constituted by an outer ring member 12 having an outer ring raceway surface 12a and an inner ring member 14 having an inner ring raceway surface 14a that faces the outer ring raceway surface 12a in the radial direction, a row of balls 28 serving as rolling elements of a single raceway, and a cage 32 that holds the balls 30 constituting the row of balls 28 in a circumferential direction in an evenly distributed manner.

Figure 10:
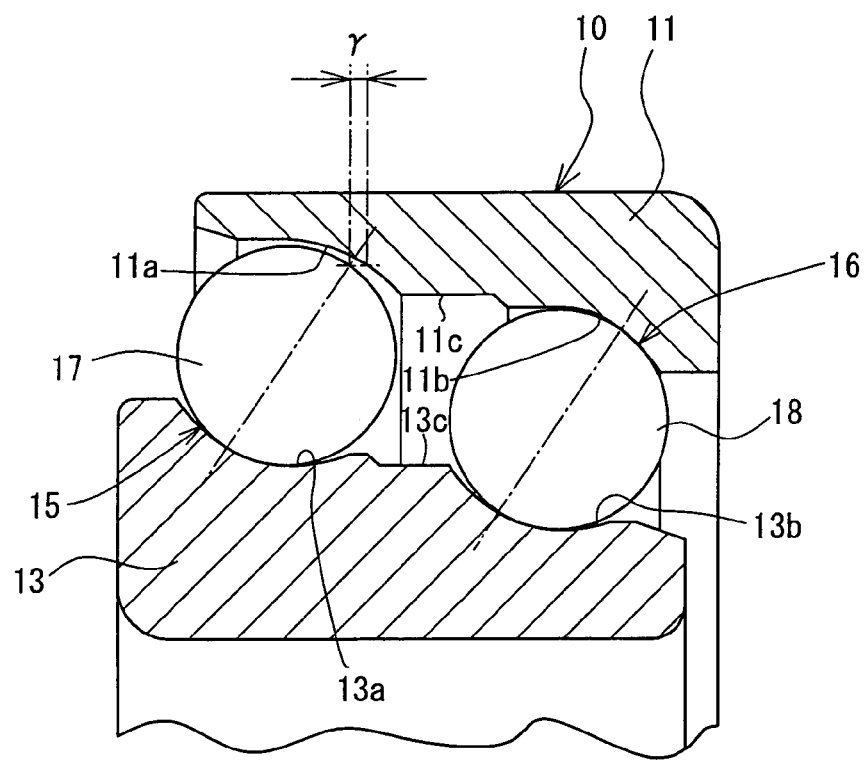
FIG. 10 is a cross-sectional view that shows an axial internal clearance of the pinion-shaft-supporting bearing device of FIG. 8.

Referring to FIG. 10, the following description discusses an axial internal clearance of the ball bearing with double raceway 10. For example, the axial internal clearance refers to an amount of shift obtained when, while the inner ring member 13 serving as one of the inner and outer ring members is secured, the outer ring member 11 serving as the other thereof is shifted in the axial direction. In a state where the small-diameter raceway surface 11b is made in contact with the small-diameter-side row of balls 16 by shifting the outer ring member 11 in the axial direction, a clearance γ appears between the large-diameter raceway surface 11a and the large-diameter-side row of balls 15.

In other words, the axial internal clearance of the large-diameter-side row of balls 15 is made greater than the axial internal clearance of the small-diameter-side row of balls 16 by the dimension γ.

Figure 11:
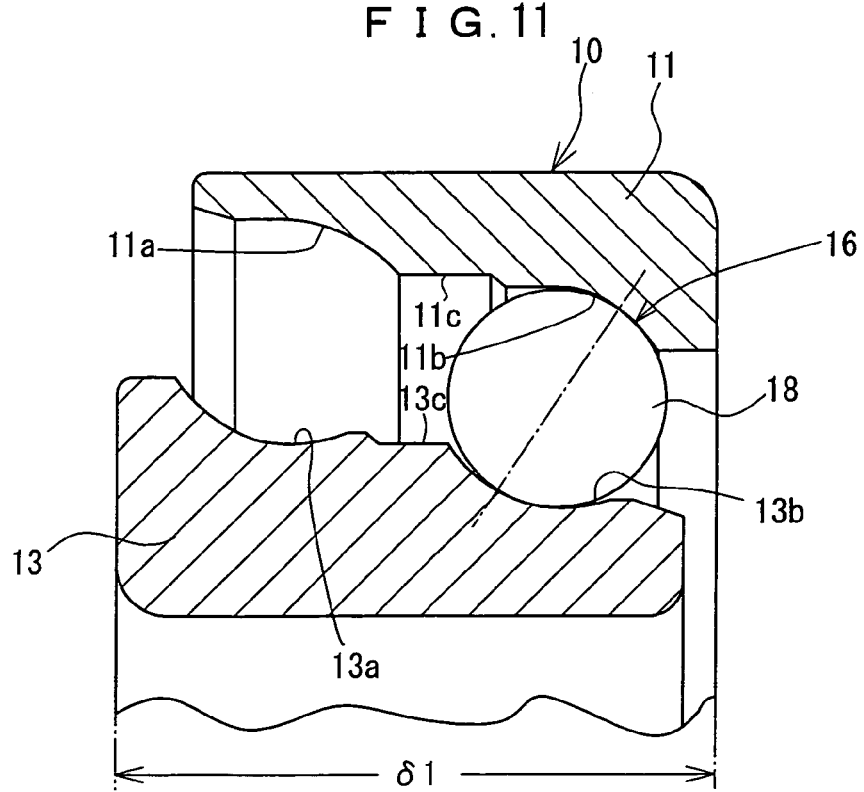
FIG. 11 is a cross-sectional view that shows a unit width of a ball bearing with double raceway of the pinion-shaft-supporting bearing device of FIG. 8.

As shown in FIG. 11, in a state where only the small-diameter-side row of balls 16 are attached, the outer ring member 11 is shifted in the axial direction so as to make the small-diameter raceway surface 11b in contact with the small-diameter-side row of balls 16 so that the maximum width dimension between the two ends of the outer ring member 11 and the inner ring member 13 in the axial direction is defined as a unit width δ1.

Moreover, as shown in FIG. 12, in a state where only the large-diameter-side row of balls 15 are attached, the outer ring member 11 is shifted in the axial direction so as to make the large-diameter raceway surface 11a in contact with the large-diameter-side row of balls 15 so that the maximum width dimension between the two ends of the outer ring member 11 and the inner ring member 13 in the axial direction is defined as a unit width δ2.

Since the axial internal clearance of the large-diameter-side row of balls 15 is set to be greater than the axial internal clearance of the small-diameter-side row of balls 16 by the dimension γ, the following relationship is satisfied between the unit width δ1 of the small-diameter-side row of balls 16 and the unit width 2 of the large-diameter-side row of balls 15.

$$\delta 1 > \delta 2 \quad (1)$$

Here, with respect to the row of balls 28 of the ball bearing with single raceway 25, for example, the same axial internal clearance as the small-diameter-side row of balls 16 of the ball bearing with double raceway 10 is prepared.

Next, the following description discusses an assembling method for such a differential device 1. Upon assembling the differential device 1, the ball bearing with double raceway 10 is provisionally assembled so that the axial internal clearance is controlled so as to satisfy the expression (1). The ball bearing with single raceway 25 is also provisionally assembled in the same manner so that the axial internal clearance is controlled.

First, in a state where the front case 3 and the rear case 4 are still separated from each other, the outer ring member 11 of the ball bearing with double raceway 10 is press-inserted to a predetermined position in the axial direction at which it comes into contact with the step portion formed in the annular wall 27A from the large-diameter opening of the front case 3. Further, the outer ring member 12 of the ball bearing with single raceway 25 is press-inserted to a predetermined position in the axial direction at which it comes into contact with the step portion formed in the annular wall 27B from the small-diameter opening of the front case 3.

In a separated manner from these processes, with respect to the unit member 21 constituted by the inner ring member 13, rows of balls 15 and 16 and cages 19 and 20 of the ball bearing with double raceway 10, its inner ring member 13 is externally fitted to the pinion shaft 7 so that the unit member 21 is positioned on the pinion gear side of the shaft portion 9 of the pinion shaft 7.

The pinion shaft 7 to which the unit member 21 has been attached is inserted from its small-diameter side, that is, from the large-diameter opening of the front case 3, so that the balls 18 of the small-diameter-side row of balls 16 of the unit member 21 are made in contact with the small-diameter raceway surface 11b of the outer ring member 11 so as to roll thereon, and so that the balls 17 of the large-diameter-side row of balls 15 of the unit member 21 are fitted to the large-diameter raceway surface 11a of the outer ring member 11 (see FIG. 13).

Next, a plastic spacer 23 is externally fitted to the shaft portion 9 of the pinion shaft 7 from the small-diameter opening of the front case 3. Successively, with respect to the unit member constituted by the inner ring member 14 of the ball bearing with single raceway 25, the row of balls 28 and the cage 32, its inner ring member 14 is externally fitted and inserted to the shaft portion 9 of the pinion shaft 7 from the small-diameter opening of the front case 3 so that the row of balls 28 of the unit member 22 are fitted to the outer ring raceway surface 12a of the outer ring member 12.

Thereafter, the shielding plate 37 is externally fitted to the shaft portion 9 of the pinion shaft 7 from the small-diameter opening of the front case 3 so that the trunk unit 44 of the companion flange 43 is spline-fitted to the shaft portion 9 so that its end face is made in contact with the shielding plate 37. Then, the oil seal 46 is attached thereto and the seal protective cup 47 is attached to the small-diameter opening of the front case 3. Successively, a nut 49 is engaged with the thread portion 48 of the shaft portion 9 so that a predetermined pre-load is applied to the balls 17 and 18 of the unit member 21 of the ball bearing with double raceway 10, as well as to the balls 30 in the unit member of the ball bearing with single raceway 25.

In other words, since the nut 49 is engaged with the thread portion 48, the inner ring member 13 of the ball bearing with double raceway 10 and the inner ring 14 of the ball bearing with single raceway 25 are sandwiched in the axial direction by the end face of the pinion gear 6 and the end face of the companion flange 43 so that a predetermined pre-load is applied to the balls 17 and 18 of the ball bearing with double raceway 10 as well as to the balls 30 of the ball bearing with single raceway 25, through the shielding plate 37 and the plastic spacer 23.

Here, in the state in which the pre-load has been applied, supposing that the axial internal clearance of the large-diameter-side row of balls 15 of the ball bearing with double raceway is A, that the axial internal clearance of the small-diameter-side row of balls 16 is B and that the axial internal clearance of the row of balls 28 of the ball bearing with single raceway 25 is C, for example, the following equations are satisfied:

$A = +10$ [μm] (positive clearance)

$B = -30$ [μm] (negative clearance)

$C = -30$ [μm] (negative clearance)

Here, the values are shown as examples, and the present invention is not limited to these.

In the differential device 1 having the arrangement, lubricating oil is stored inside the differential case 2 so as to be maintained at a level L in a driving-stop state. The oil is splashed up as the ring gear 8 rotates upon driving so that the oil is directed and supplied over the ball bearings with double raceway 10 and the ball bearing with single raceway 25 through the oil circulating path 40 inside the front case 3 to lubricate the ball bearings with double race way 10 and the ball bearing with single raceway 25, and is again circulated through the inside of the differential case 2.

In this manner, among the rows of balls 15 and 16 in the ball bearing with double raceway 10, the axial internal clearance between the large-diameter-side row of balls 15 placed on the pinion gear side that is subjected to a greater load and the raceway surfaces 11a and 13a thereof is made greater than the axial internal clearance between the small-diameter-side row of balls 16 placed on the anti-pinion gear side that is subjected to a smaller load and the raceway surfaces 11b and 13b thereof by a dimension γ. Therefore, in a state where a pre-load is applied, the axial internal clearance A of the large-diameter-side row of balls 15 forms a positive clearance, and the axial internal clearance B of the small-diameter-side row of balls 16 forms a negative clearance. Consequently, upon imposing a load on the rows of balls 15 and 16, a radial load and an axial load are first supported by the row of balls 16 placed on the anti-pinion gear side that is subjected to a smaller load, while a radial load is mainly supported by the row of balls 15 placed on the pinion gear side that is subjected to a greater load. Therefore, the imposed load is shared by the row of balls 15 placed on the pinion gear side and the row of balls 16 placed on the anti-pinion gear side, and the lives of the respective rows of balls 15 and 16 are averaged so that the life of the entire system of the ball bearing with double raceway 10 is lengthened.

Since the large-diameter-side row of balls 15 of the ball bearing with double raceway 10 is not subjected to a great load, it is not necessary to increase the diameter of the large-diameter-side row of balls 15 so that it becomes possible to provide a small-size device.

Since the axial internal clearance of the row of balls 28 of the ball bearing with single raceway 25 is made virtually equal in the size to the axial internal clearance of the small-diameter-side row of balls 16 of the ball bearing with double raceway 10, a load is exerted on the rows of balls 16 and 28 in a well-balanced manner so that it becomes possible to further improve the system life.

In the pinion-shaft-supporting bearing device of the present embodiment, the ball bearing with double raceway 10, which has a smaller frictional resistance, is used as a ball bearing on the pinion bear side that is subjected to a greater load as compared to the anti-pinion gear side. Thus, in comparison with the conventional tapered roller bearing, the rotary torque is reduced, thereby making it possible to improve the efficiency of the differential device 1. Further, not a ball bearing with single raceway, but a ball bearing with double raceway is used so that the load capacity is increased as compared to the ball bearing with single raceway, thereby providing sufficient supporting rigidity.

With respect to the ball bearing with double raceway 10, the angular ball bearing of the tandem type in which the pitch circle diameter D1 of the large-diameter-side row of balls 15 on the pinion gear side is made greater than the pitch circle diameter D2 of the small-diameter-side row of balls 16 is used; therefore, in the case when the balls 17 and 18 of the two rows have the same diameter, the number of the balls 17 on the large-diameter-side row of balls 15 on the pinion gear side can be increased as compared to the number of the balls 18 on the small-diameter-side row of balls 16, with the result that the ball bearing with double raceway 10 is allowed to withstand a greater load.

Here, the ball bearing 25 on the anti-pinion gear side is not limited by the angular ball bearing with single raceway. For example, a tandem type angular ball bearing with double raceway in which the pitch circle diameter of the row of balls on the anti-pinion bear side is made greater than the pitch circle diameter of the row of balls on the pinion gear side, or a tapered roller bearing, which forms a back-to-back duplex bearing in cooperation with a ball bearing with double raceway 10, may be used.

FIGS. 14, 15, 16A and 16B show modified examples of the present invention. The ball bearings with double raceway 10 and 25 in the embodiment are prepared as an oil lubricating type. In contrast, the bearing to be used in the differential device 1 in these modified embodiments is prepared as a grease lubricating type. Therefore, no oil circulating path 40, shown in FIG. 1, is installed in the differential case 2.

Figure 15:
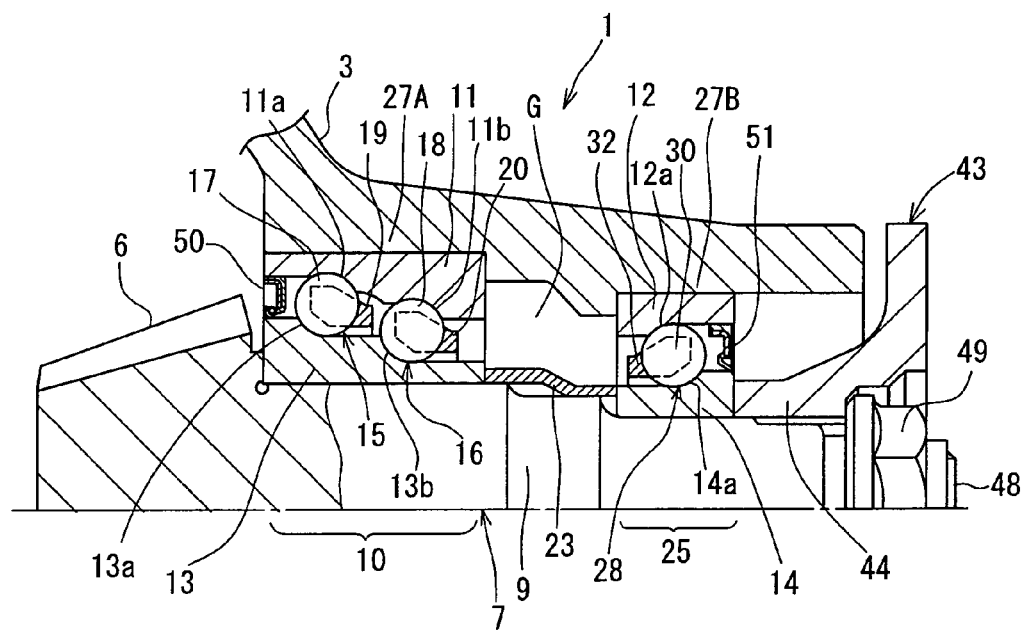
FIG. 15 is a cross-sectional view that shows a pinion-shaft-supporting bearing device of the differential device of FIG. 14.

As shown in FIGS. 14 and 15, the pinion-shaft-supporting bearing device of the present modified example uses a tandem-type angular ball bearing with double raceway as the ball bearing with double raceway 10 on the pinion gear side, and also uses an angular ball bearing with single raceway as the ball bearing with single raceway on the anti-pinion gear side 25, with grease G being injected between the ball bearing with double raceway 10 and the ball bearing with single raceway 25.

The ball bearing with double raceway 10 is constituted by an outer ring member 11 having a pair of outer ring raceway surfaces 11a and 11b that are separated from each other in the axis direction, an inner ring member 13 having a pair of inner ring raceway surfaces 13a and 13b and two rows of balls 15 and 16 that are held by respective cages 19 and 20 in the circumferential direction so as to be evenly distributed.

The ball bearing with single raceway 25 is constituted by an outer ring member 12 having an outer ring raceway surface 12a, an inner ring member 14 having an inner ring raceway surface 14a and a row of balls 28 that are held by a cage 32 so as to be evenly distributed in the circumferential direction.

Seal members 50 and 51 are placed on the pinion gear side end of the ball bearing with double raceway 10 and the anti-pinion gear side end of the ball bearing with single raceway 25. Grease G is injected into a gap between the ball bearing with double raceway 10 and the ball bearing with single race way 25, and tightly sealed therein by these seal members 50 and 51.

With respect to the ball bearing with double raceway 10, the axial internal clearance is controlled so as to satisfy the relationship represented by the expression (1). Moreover, the axial internal clearance of the ball bearing with single raceway 25 is set to have the same axial internal clearance as that of the small-diameter-side row of balls 16 side of the ball bearing with double raceway 10.

With respect to the seal member 50 placed on the pinion gear side end of the ball bearing with double raceway 10, a type of seal referred to as an oil seal is used, and with respect to the seal member 51 that is placed on the anti-pinion gear side end of the bearing ball with single raceway 25, a type of a seal referred to as a bearing seal is used.

Figure 16A:
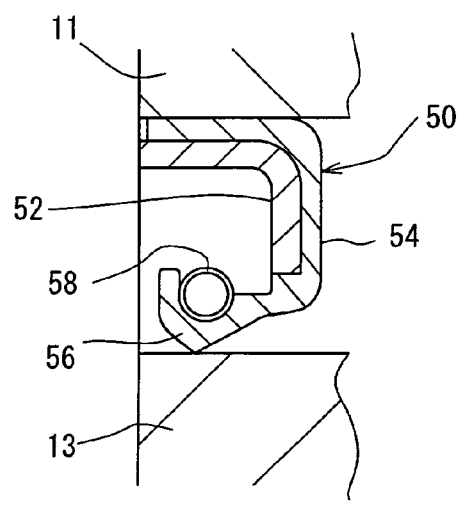
FIG. 16A is an enlarged cross-sectional view that shows one of seal members of the pinion-shaft-supporting bearing device of FIG. 15.
Figure 16B:
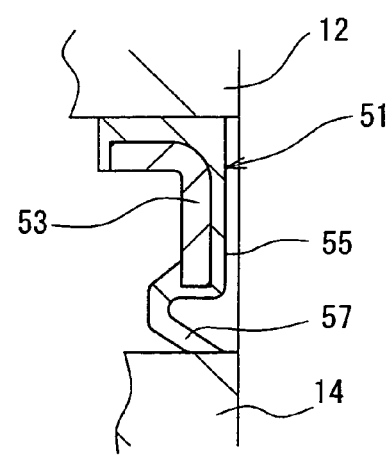
FIG. 16B is an enlarged cross-sectional view that shows the other seal member of the pinion-shaft-supporting bearing device of FIG. 15.

As shown in FIGS. 16A and 16B, the respective seal members 50 and 51 are formed by curing and bonding elastic members 54 and 55 such as rubber to respective ring-shaped core metal parts 52 and 53. Here, lip portions 56 and 57, which are made in contact with the elastic members 54 and 55 with a predetermined binding force to the inner ring members 13 and 14, are formed on the elastic members 54 and 55.

The lip portion 56 of the seal member 50 mainly prevents gear oil from flowing therein, and the lip portion 57 of the seal member 51 mainly prevents sewage and foreign matters from flowing therein from the outside of the bearing.

The seal member 50 allows the spring 58 to forcefully press the lip portion 56 onto the inner ring member 13; thus, the sealing property is readily improved so that it is possible to positively prevent oil from entering the inside of the bearing.

The seal member 51 is designed so that the inner diameter of the lip portion 57 is made smaller than the outer diameter of the shoulder portion of the inner ring member 14 by a predetermined dimension; thus, this dimensional difference makes the lip portion 57 in contact with the inner ring member 14 with an elastically expanded diameter.

The bearing device is occasionally exposed to temperatures in a range of 130° C. to 150° C. For this reason, acrylic rubber, heat resistant acrylic rubber and the like are preferably used as the elastic members 54 and 55 of the respective seal members 50 and 51. The heat resistant acrylic rubber is an ethylene-acrylic rubber in which ethylene and acrylic acid ester are bonded to each other as main components of a copolymer composition.

Moreover, with respect to the grease G to be sealed in the bearing device, diurea-based grease or ester-based grease that has a good compatibility with gear oil is preferably used from the view point of good heat resistance. More specific preferable examples thereof include: brand name KNG170 made by NIPPON GREASE CO., LTD. and brand name Multemp SB-M made by KYODO YUSHI CO., LTD. KNG170, which uses poly α-olefin mineral oil as a basic oil with diurea being used as a thickener, has an application temperature range from −30° C. to 150° C. Multemp, which uses synthesized hydrocarbon as a basic oil with diurea being used as a thickener, has an application temperature range from −40° C. to 200° C.

The other structures are the same as those explained by using FIGS. 7 through 13.

The pinion-shaft-supporting bearing device having the arrangement also makes it possible to provide the same effects as those shown in FIGS. 7 through 13.

Different from the oil lubricating type, the bearing device of the present invention, which is prepared as the grease lubricating type, eliminates the necessity of forming an oil directing path and an oil circulating path inside the differential case 2. Therefore, it is possible to achieve a small-size and light-weight differential device 1, and since it is also possible to make the pinion-shaft-supporting bearing device less susceptible to adverse effects from foreign matters contained in the oil in the differential device 1, the bearing life can be improved.

With respect to the sealed space to be filled with grease G, in addition to ring-shaped spaces between the respective inner and outer rings of the ball bearing with double raceway 10 and the ball bearing with single raceway 25, spaces between the front case 3 and the pinion shaft 7 that are located between the ball bearing with double raceway 10 and the ball bearing with single raceway 25 are also used. Therefore, it is possible to sufficiently maintain the amount of grease G used for lubricating the ball bearing with double raceway 25 and the ball bearing with single raceway 10.

With respect to the bearing on the anti-pinion gear side, a tandem-type angular ball bearing with double raceway and a tapered roller bearing may be used.

Figure 17:
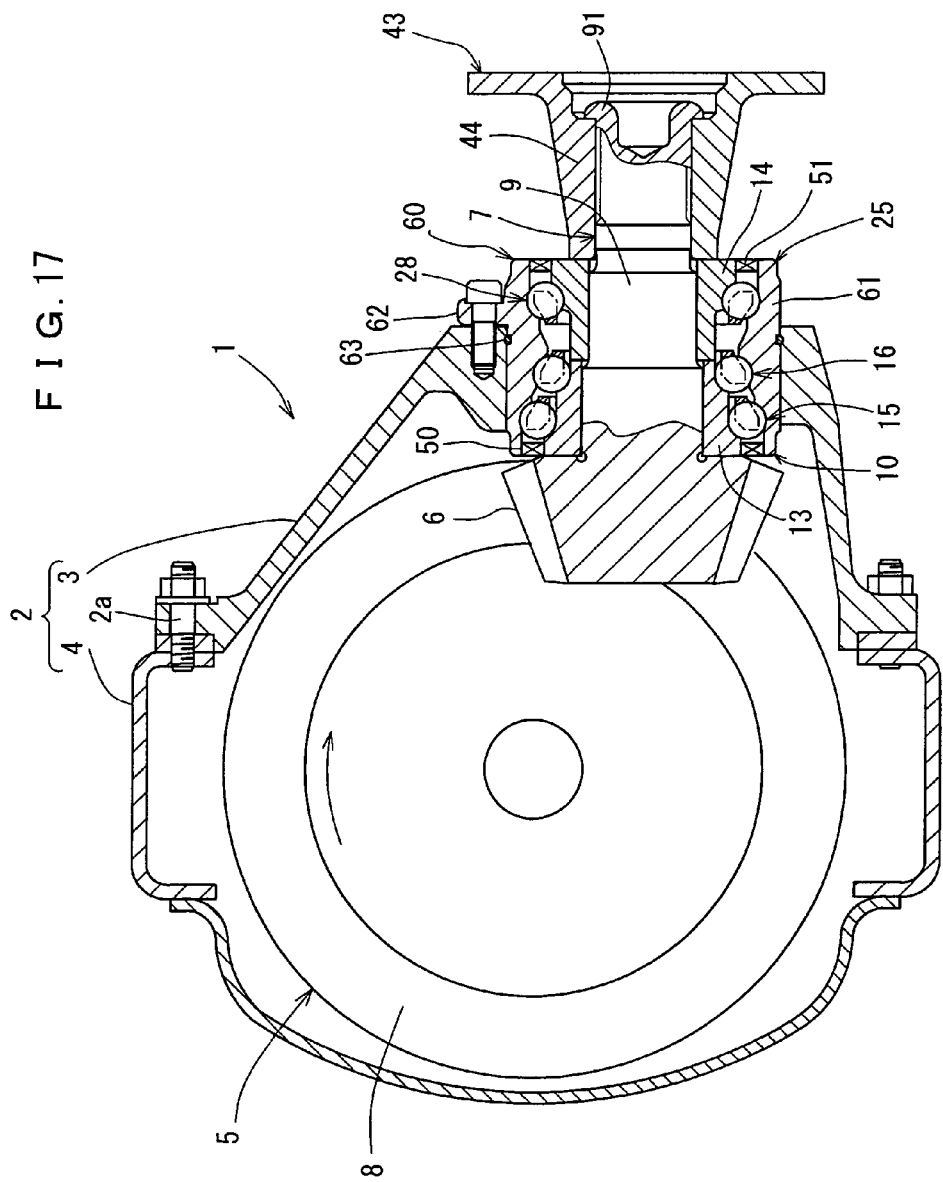
FIG. 17 is a cross-sectional view showing an entire structure of a differential device according to still another embodiment of the present invention.
Figure 18:
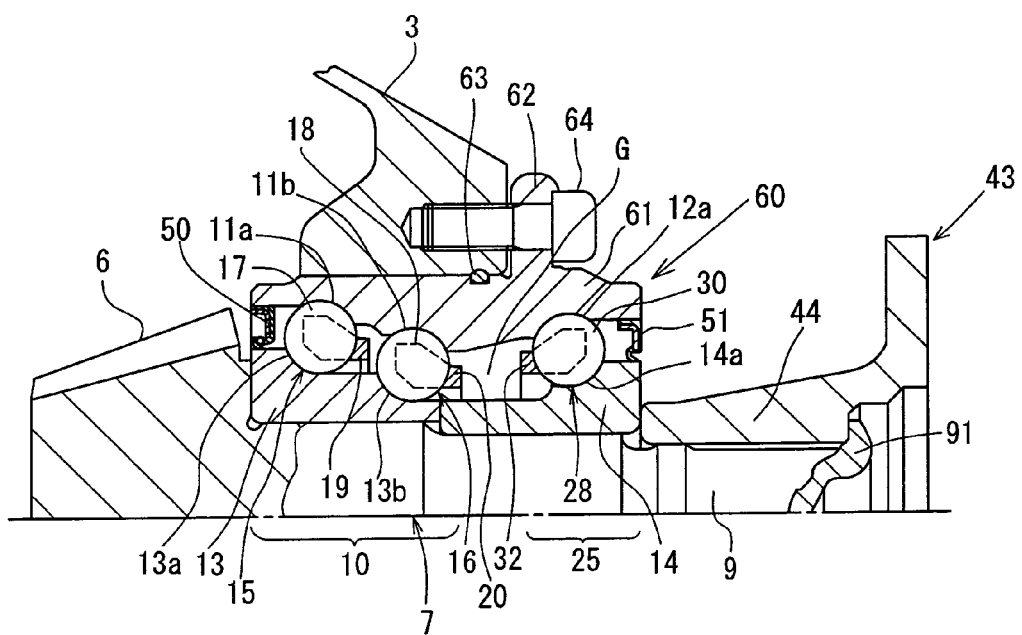
FIG. 18 is a cross-sectional view that shows a pinion-shaft-supporting bearing device of the differential device of FIG. 17.

FIGS. 17 and 18 show another modified example of the present invention.

In the present modified example, a bearing unit 60 is used as the pinion-shaft-supporting bearing device. By using this bearing unit 60, the pinion shaft 7 is supported on the front case 3 of the differential case 2 so as to freely rotate thereon.

The bearing unit 60 is provided with a ball bearing with double raceway 10 that is a tandem-type angular ball bearing with double raceway on the pinion gear side and a ball bearing with single raceway 25 that is an angular ball bearing with single raceway on the anti-pinion gear side.

The ball bearing with double raceway 10 is constituted by an outer ring member 61, an inner ring member 13 and two rows of balls 15 and 16 that are held by respective cages 19 and 20. The ball bearing with single raceway 25 is constituted by an outer ring member 61, an inner ring member 14 and a row of balls 28 held by a cage 32. A pair of inner ring raceway surfaces 13a and 13b are formed on an outer circumferential face of the inner ring member 13, and an inner ring raceway surface 14a is formed on the outer circumferential face of the inner ring member 14. Outer ring raceway surfaces 11a, 11b and 12a, which face the respective inner ring raceway surfaces 13a, 13b and 14a in the radial direction, are formed on the inner circumferential face of the outer ring member 61. Both of the inner ring members 13 and 14 are allowed to butt each other in the axial direction.

The bearing unit 60 is provided with seal members 50 and 51 on two sides thereof in the axial direction. These seal members 50 and 51 seal grease G inside the ring shaped spaces that are located between the outer ring member 61 and the two inner ring members 13 and 14.

The rows of balls 15 and 16 of the ball bearing with double raceway 10 are controlled in the axial inner clearances thereof so as to satisfy the relationship of the expression (1). The row of balls 28 of the ball bearing with single raceway 25 is also set to have the same axial inner internal clearance as the small-diameter-side row of balls 16 of the ball bearing with double raceway 10.

The following description discusses an assembling method for the differential device 1. With respect to the bearing unit 60, upon manufacturing, the inner ring members 13 and 14, the outer ring member 61 and the rows of balls 15, 16 and 28 that are held by the cages 19, 20 and 32 are properly assembled so that an accurate pre-load is applied thereto.

The bearing unit 60 is assembled onto the pinion shaft 7 from the drive shaft side, with the inner ring member 13 being externally fitted and inserted to the large-diameter portion of the pinion shaft 7 and the inner ring member 14 being externally fitted and inserted to the middle-diameter portion thereof. Next, the companion flange 43 is spline-fitted to the small-diameter portion of the pinion shaft 7, and the end portion on the drive shaft side of the shaft portion 9 of the pinion shaft 7 is deformed outward in the radial direction so that this portion is caulked onto the companion flange 43. A caulked portion 91 is formed on the shaft portion 9 through these processes so that the bearing unit 60 is sandwiched by the pinion gear 6 and the trunk portion 44 of the companion flange 43; thus, a pre-load is applied.

Moreover, the flange 62 formed on the outer ring member 61 is made in contact with the outer face of the front case 3, and a bolt 64 is inserted through the flange 62, and connected to the front case 3 so that the bearing unit 60 is secured to the front case 3.

A packing 63 that prevents oil of the differential device 1 from leaking is interpolated between the outer circumferential portion of the outer ring member 61 and the inner wall face of the attaching opening of the front case 3.

The other structures are the same as those of examples shown in FIGS. 7 through 13.

The pinion-shaft-supporting bearing device having the arrangement makes it possible to provide the same effects as those of examples shown in FIGS. 15 and 16.

Moreover, since the bearing unit formed by using a single outer ring member 61 is used as a bearing that supports the pinion shaft 7 on the differential case 2 so as to freely rotate thereon, the pre-load adjustment is accurately carried out in the manufacturing processes of the bearing unit 60. Therefore, it becomes possible to eliminate the necessity of conducting pre-load adjusting operations at the time of assembling the differential device 1. Thus, it becomes possible to reduce the number of assembling processes of the differential device 1, and consequently to improve the assembling property.

Figure 19:
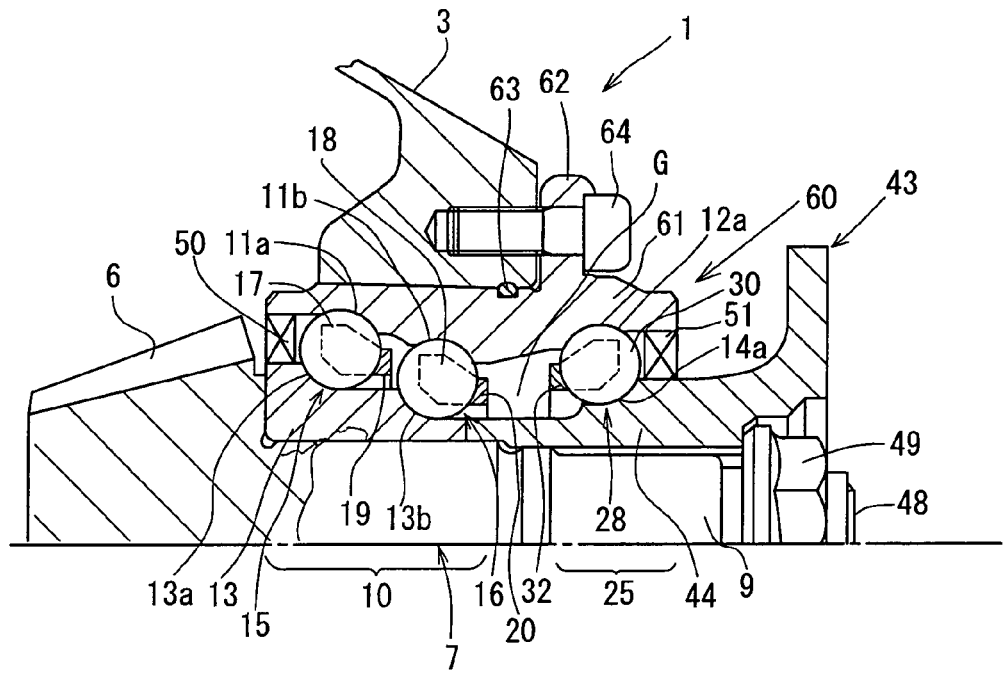
FIG. 19 is a cross-sectional view showing a pinion-shaft-supporting bearing device of a differential device according to still another embodiment of the present invention.

FIG. 19 further shows another modified example of the present invention. FIG. 19 shows a cross-sectional view of the pinion-shaft-supporting bearing device of a differential device 1 in the present modified example.

In the present modified example, the trunk portion 44 of the companion flange 43 is used as the inner ring member of the ball bearing with single raceway 25 on the anti-pinion gear side of the shaft-receiving unit 60.

In other words, an inner ring raceway surface 14a is formed on the outer circumferential face of the trunk portion 44 of the companion flange 43. Thus, the ball bearing with single raceway 25 is constituted by the companion flange 43, the outer ring member 61 and the row of balls 28 that are held by the cage 32.

The rows of balls 15 and 16 of the ball bearing with double raceway 10 are controlled in their axial internal clearances so as to satisfy the relationship of the expression (1). Moreover, with respect to the row of balls 28 of the ball bearing with single raceway 25 also, for example, the same axial internal clearance as that of the small-diameter-side row of balls 16 of the ball bearing with double raceway 10 is prepared.

With respect to the assembling processes of the bearing unit 60, the inner ring member 13 is press-inserted into the pinion shaft 7 from the drive shaft side, and the companion flange 43 is spline-fitted to the pinion shaft 7, with the nut 49 being fastened to the drive-shaft-side end of the pinion shaft 7, so that a pre-load is applied onto the bearing unit 60.

The bearing unit 60, assembled as described above, is secured by inserting a bolt 64 into the flange 62 to be fastened to the front case 3, with the flange 62 formed on the outer ring member 61 being made in contact with the outer face of the front case 3.

Here, the other structures are the same as those of examples shown in FIGS. 17 and 18.

The pinion-shaft-supporting bearing device having the arrangement also makes it possible to provide the same effects as those of examples shown in FIGS. 17 and 18.

In the present modified example, since the trunk portion 44 of the companion flange 43 is used as the inner ring member of the ball bearing 25 with single raceway, it becomes possible to reduce the number of parts in comparison with a conventional differential device, and consequently to reduce the manufacturing costs.

Figure 20:
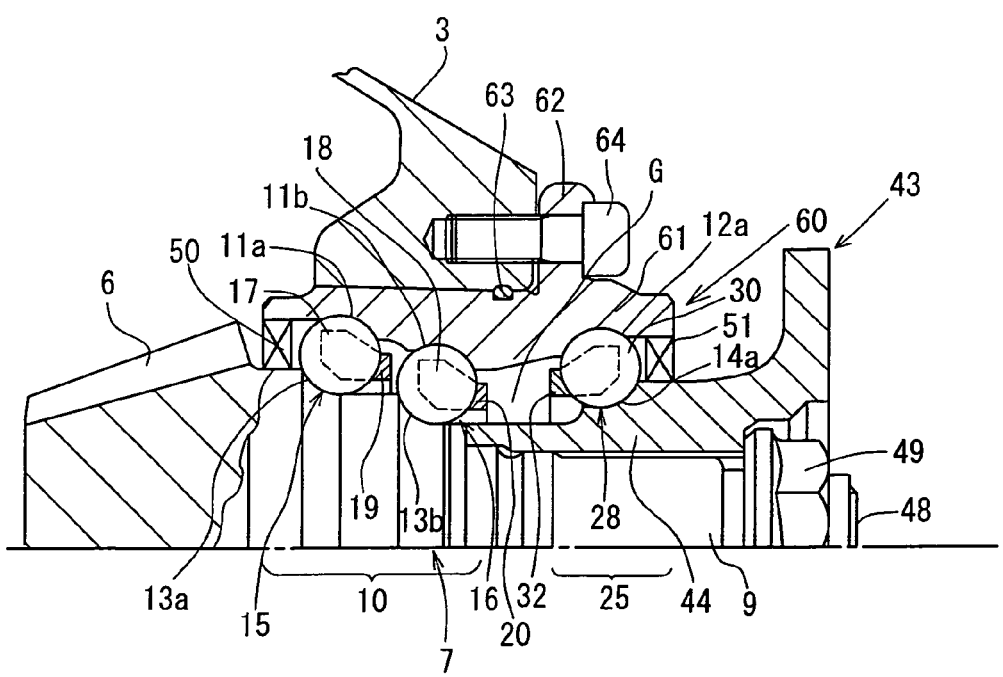
FIG. 20 is a cross-sectional view showing a pinion-shaft-supporting bearing device of a differential device according to the other embodiment of the present invention.
Figure 21:
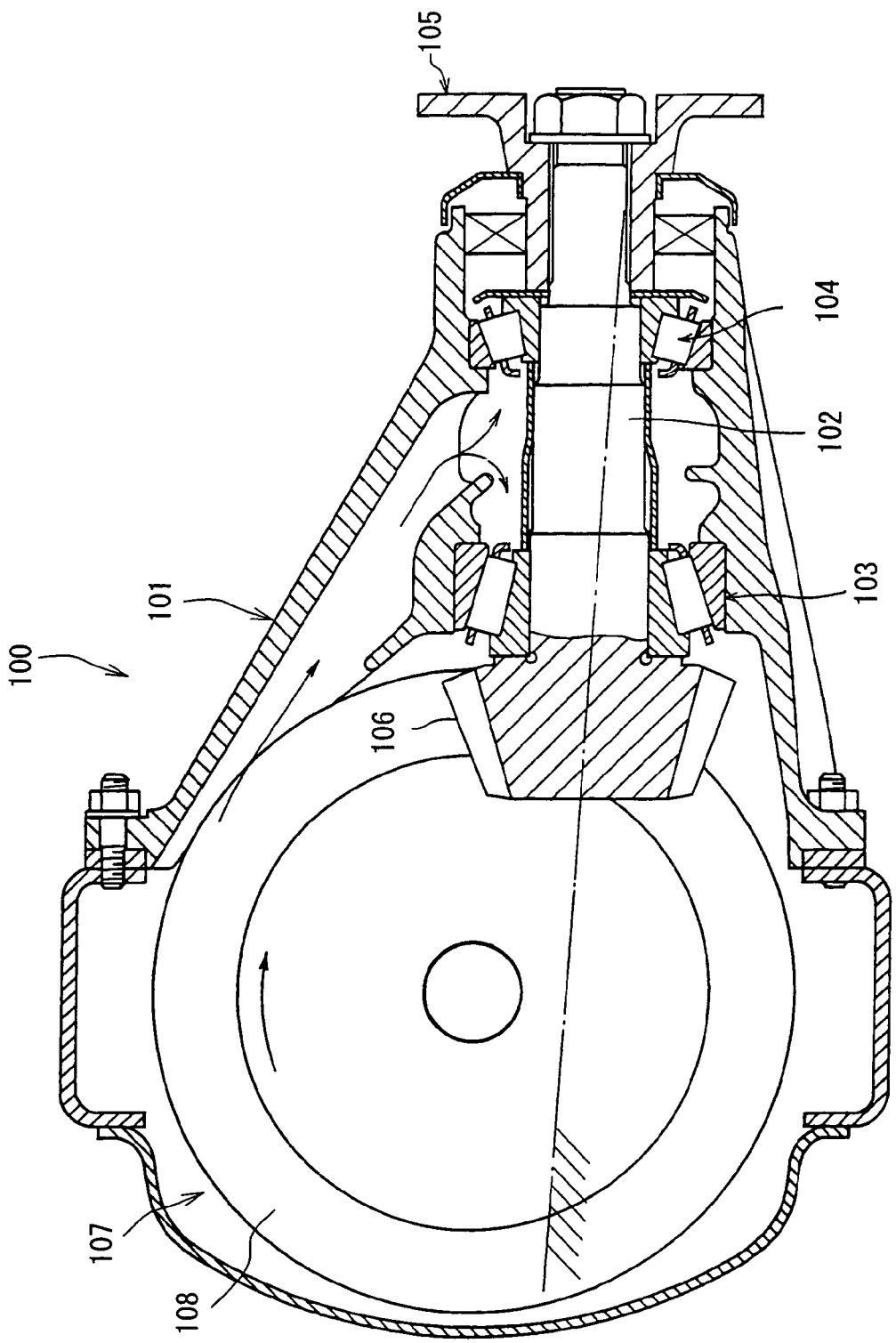
FIG. 21 is a cross-sectional view that shows an entire structure of a prior art differential device.

FIG. 20 shows still another modified example of the present invention.

FIG. 20 shows a cross-sectional view of a pinion-shaft-supporting bearing device of a differential device in accordance with the present modified example.

In the present modified example, the trunk 44 of the companion flange 43 is used as the inner ring member of the bearing with single raceway 25 on the anti-pinion gear side of the bearing unit 60, and the shaft portion 9 of the pinion shaft 7 is used as the inner ring member of the ball bearing with double raceway 10 on the pinion bear side.

An inner ring raceway surface 14a is formed on the outer circumferential face of the trunk portion 44 of the companion flange 43. The ball bearing with single raceway 25 is constituted by a companion flange 43, an outer ring member 61 and a row of balls 28 that are held by a cage 32.

A pair of inner-ring raceway surfaces 13a and 13b, each having a larger diameter on the pinion gear side, which are separated from each other in the axial direction, are formed on the outer circumferential face of the shaft portion 9 of the pinion shaft 7. The rolling bearing with double raceway 10 is constituted by a pinion shaft 7, an outer ring member 61 and rows of balls 15 and 16 that are held by cages 19 and 20.

The ball bearing with double raceway 10 is controlled in its axial internal clearance so as to satisfy the relationship of the expression (1). Moreover, with respect to the row of balls 28 of the ball bearing with single raceway 25 also, for example, the same axial internal clearance as that of the small-diameter-side row of balls 16 of the ball bearing with double raceway 10 is prepared.

With respect to the assembling processes of the bearing unit 60, the rows of balls 15 and 16 are attached to the inner-ring raceway surfaces 13a and 13b of the pinion shaft 7 from the drive shaft side, and the companion flange 43 is spline-fitted to the pinion shaft 7, with the nut 49 being fastened to the drive-shaft-side end of the pinion shaft 7, so that a pre-load is applied thereon so as to be secured.

Moreover, the flange 62 of the outer ring member 61 is made in contact with the outer face of the front case 3, and the bolt 64 is inserted into the flange 62, and fastened to the front case 3.

Here, the other structures are the same as those of examples shown in FIGS. 17 and 18.

The pinion-shaft-supporting bearing device having the arrangement also makes it possible to provide the same effects as those of examples shown in FIGS. 17 and 18.

Furthermore, the inner ring of the ball bearing with single raceway 25 is integrally formed in the companion flange 43, with the inner ring of the ball bearing with double raceway 10 being integrally formed in the pinion shaft 7, so that it becomes possible to reduce the number of parts, and consequently to further cut the manufacturing costs.

In accordance with the pinion-shaft-supporting bearing device of the embodiments, in the angular ball bearing with double raceway on the pinion gear side, the imposed load is shared by the row of balls placed on the pinion gear side and the row of balls placed on the anti-pinion gear side; thus, the lives of the respective rows of balls are averaged so that the life of the entire system of the ball bearing with double raceway is lengthened.

INDUSTRIAL APPLICABILITY

The rolling bearing with double raceway of the present invention is desirably applicable to a differential device or the like that is installed in, for example, a vehicle.

The invention claimed is:

1. A ball bearing with double raceway, which rotatably supports a pinion shaft having a pinion gear on one end thereof in an axial direction, comprising:
   an outer ring member having a large-diameter raceway surface and a small-diameter raceway surface that are spaced from each other in the axial direction;
   an inner ring member having a large-diameter raceway surface and a small-diameter raceway surface that are spaced from each other in the axial direction so as to be respectively positioned inside the large-diameter raceway surface and the small-diameter raceway surface in a radial direction;
   a large-diameter-side row of balls that are interpolated between the two large-diameter raceway surfaces;
   a small-diameter-side row of balls that are interpolated between the two small-diameter raceway surfaces,
   wherein internal clearances on the two large-diameter raceway surfaces side as well as on the two small-diameter raceway surfaces side are designed to have respectively different sizes in such a manner that upon applying a load on the pinion shaft, the row of balls on the anti-pinion gear side of the two rows of balls is subjected to the load prior to the row of balls on the pinion gear side.

2. The ball bearing with double raceway according to claim 1, wherein a radial internal clearance on the anti-pinion gear side is made smaller than a radial internal clearance on the pinion gear side.

3. The ball bearing with double raceway according to claim 1, wherein an axial internal clearance on the anti-pinion gear side is made smaller than an axial internal clearance on the pinion gear side.

4. The ball bearing with double raceway according to claim 1, wherein balls that respectively constitute the row of balls on the pinion gear side and the row of balls on the anti-pinion gear side have virtually the same diameter so that the row of balls on the pinion gear side have a pitch circle diameter greater than the pitch circle diameter of the row of balls on the anti-pinion gear side.

5. A pinion-shaft-supporting bearing device comprising:
   a plurality of rolling bearings that support a pinion shaft having a pinion gear at one end in an axial direction at predetermined positions on the pinion gear side and the anti-pinion gear side,
   wherein at least the rolling bearing on the pinion gear side is prepared as a ball bearing with double raceway that comprises: an outer ring member having a large-diameter raceway surface and a small-diameter raceway surface that are placed in a separate manner from each other in the axial direction; an inner ring member having a large-diameter raceway surface and a small-diameter raceway surface that are placed in a separate manner from each other in the axial direction; a large-diameter-side row of balls and a small-diameter-side row of balls that are respectively interpolated between the raceway surfaces of the outer ring member as well as between the raceway surfaces of the inner ring member, the ball bearing with double raceway being arranged so that internal clearances on the two large-diameter raceway surfaces side as well as on the two small-diameter raceway surfaces side are designed to have respectively different sizes in such a manner that upon applying a load on the pinion shaft, the row of balls on the anti-pinion gear side of the two rows of balls is subjected to the load prior to the row of balls on the pinion gear side.

6. The pinion-shaft-supporting bearing device according to claim 5, wherein the large-diameter-side row of balls are placed on the pinion gear side and the small-diameter-side row of balls are placed on the anti-pinion gear side, and a radial internal clearance on the anti-pinion gear side is made smaller than a radial internal clearance on the pinion gear side.

7. The pinion-shaft-supporting bearing device according to claim 5, wherein the large-diameter-side row of balls are placed on the pinion gear side and the small-diameter-side row of balls are placed on the anti-pinion gear side, and an axial internal clearance on the anti-pinion gear side is made smaller than an axial internal clearance on the pinion gear side.

8. A pinion-shaft-supporting bearing device comprising:
   a plurality of rolling bearings that rotatably support a pinion shaft having a pinion gear at one end in an axial direction at predetermined positions on the pinion gear side and the anti-pinion gear side,
   wherein the rolling bearing on the pinion gear side is prepared as a ball bearing with double raceway that comprises: an outer ring member having a large-diameter raceway surface and a small-diameter raceway surface that are spaced from each other in the axial direction; an inner ring member having a large-diameter raceway surface and a small-diameter raceway surface that are spaced from each other in the axial direction; and a large-diameter-side row of balls and a small-diameter-side row of balls that are respectively interpolated between the raceway surfaces of the outer ring members as well as between the raceway surfaces of the inner ring members, and the rolling bearing on the anti-pinion gear side is prepared as a ball bearing with single raceway that comprises: an outer ring member, an inner ring member and a single row of balls that are interpolated between an outer ring raceway surface formed on the outer ring member and an inner ring raceway surface formed on the inner ring member, the ball bearing with double raceway being arranged so that an internal clearance on the anti-pinion gear side is made smaller than an internal clearance on the pinion gear side in such a manner that upon applying a load on the pinion shaft, the row of balls on the anti-pinion gear side of the two rows of balls is subjected to the load prior to the row of balls on the pinion gear side, the ball bearing with single raceway being arranged so that an internal clearance in the ball bearing with single raceway being made virtually equal to an internal clearance on the anti-pinion side in the ball bearing with double raceway.

9. The pinion-shaft-supporting bearing device according to claim 8, wherein a radial internal clearance on the anti-pinion gear side in the ball bearing with double raceway is made smaller than a radial internal clearance on the pinion gear side, and a radial internal clearance in the ball bearing with single raceway is made virtually equal to a radial internal clearance on the anti-pinion side in the ball bearing with double raceway.

10. The pinion-shaft-supporting bearing device according to claim 8, wherein an axial internal clearance on the anti-pinion gear side in the ball bearing with double raceway is made smaller than an axial internal clearance on the pinion gear side, and an axial internal clearance in the ball bearing with single raceway is made virtually equal to an axial internal clearance on the anti-pinion side in the ball bearing with double raceway.

* * * * *